(12) United States Patent
Chou et al.

(10) Patent No.: US 9,495,731 B2
(45) Date of Patent: Nov. 15, 2016

(54) DEBANDING IMAGE DATA BASED ON SPATIAL ACTIVITY

(71) Applicant: Apple Inc., Cupertino, CA (US)

(72) Inventors: Jim C. Chou, San Jose, CA (US); Guy Cote, San Jose, CA (US); Haiyan He, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/687,478

(22) Filed: Apr. 15, 2015

(65) Prior Publication Data
US 2016/0307302 A1 Oct. 20, 2016

(51) Int. Cl.
| | |
|---|---|
| G06K 9/40 | (2006.01) |
| G06T 5/00 | (2006.01) |
| G06T 5/20 | (2006.01) |
| G06T 5/50 | (2006.01) |
| H04N 19/117 | (2014.01) |

(52) U.S. Cl.
CPC ............... G06T 5/002 (2013.01); G06T 5/20 (2013.01); G06T 5/50 (2013.01); G06K 9/40 (2013.01); G06T 2207/20182 (2013.01); G06T 2207/20221 (2013.01); H04N 19/117 (2014.11)

(58) Field of Classification Search
CPC ......... G06T 5/002; G06T 5/003; G06T 5/20; G06T 5/50; G06T 2207/20182; G06T 2207/20221; G06K 9/40; H04N 19/117
USPC ........................................ 382/260, 263–264
See application file for complete search history.

(56) References Cited

U.S. PATENT DOCUMENTS

| | | | | |
|---|---|---|---|---|
| 5,119,195 | A * | 6/1992 | Christopher | H04N 5/21 348/618 |
| 7,424,166 | B2 * | 9/2008 | Daly | G06T 5/004 375/E7.027 |
| 7,945,111 | B2 | 5/2011 | Ishiga | |
| 8,036,457 | B2 | 10/2011 | Matsushita et al. | |
| 8,041,138 | B2 * | 10/2011 | Horie | G06T 5/004 382/254 |
| 8,295,595 | B2 | 10/2012 | Matsushita et al. | |
| 8,600,188 | B2 * | 12/2013 | Segall | H04N 5/208 348/606 |
| 9,172,933 | B2 * | 10/2015 | Ben-Chorin | H04N 9/67 |
| 9,177,366 | B2 * | 11/2015 | Koehler | G06T 5/50 |
| 2012/0189208 | A1 | 7/2012 | Inaba et al. | |
| 2012/0200669 | A1 | 8/2012 | Lai et al. | |

* cited by examiner

*Primary Examiner* — Kanjibhai Patel
(74) *Attorney, Agent, or Firm* — Fletcher Yoder PC

(57) ABSTRACT

A method for attenuating banding in image data may involve receiving a stream of input pixels. The method may then include applying a bi-lateral filter to a first portion of the stream of input pixels to generate a first filtered output and applying a high pass filter to a second portion of the stream of input pixels to generate a second filtered output. The method may then determine a local activity and a local intensity associated with the first portion of the stream. The method may then include blending the first filtered output with the first portion of the stream of input pixels based at least in part on the local activity and the local intensity to generate a third filtered output. Afterward, the method may combine the third filtered output with the second filtered output to generate a fourth filtered output that may be output as the image data.

20 Claims, 17 Drawing Sheets

DEBANDING IMAGE DATA BASED ON SPATIAL ACTIVITY

BACKGROUND

The present disclosure relates generally to processing image data with image signal processor logic and, more particularly, to filtering pixel data using a tri-lateral filter.

Handheld devices, computers, and a variety of other electronic devices are increasingly used to view images and videos. To efficiently provide this image data to the various types of electronic devices, the image data may be sent from a content provider in a compressed format. After the digital imaging device receives the compressed image data, an image-processing pipeline may apply a number of image processing operations to generate a full color, processed image or a full color, processed video associated with the image data. Although conventional image processing techniques aim to produce a polished image, these techniques may not adequately address many image distortions and errors introduced when the original image data is compressed for storage and transmission. For example, certain bits related to pixel intensities in the image data may be truncated or lost during the compression process. These lost bits may cause the depicted image or video data to display a banding effect, which is generally undesirable. Unfortunately, conventional debanding techniques may not adequately resolve the banding issue.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to attenuating banding visual effects using a tri-lateral filter. Generally, the trilateral filter may attenuate pixel data based on pixel intensity using a bi-lateral filter and a third component that considers spatial activity. With this in mind, the image processing circuitry may split input pixels into low and high frequency components and apply a bi-lateral filter on the low frequency components, while applying a high pass coring filter on the high frequency components.

In addition to applying the bi-lateral filter to the low frequency components, the image processing circuitry may determine a first attenuation factor and a second attenuation factor for the pixel data based on the local activity of the low frequency components and the local intensity of the original pixel data, respectively. After applying the bi-lateral filter to the low frequency components, the output of the bi-lateral filter may be combined or blended in with the original pixel data, such that the blended data may be attenuated using the first and second attenuation factors. The resulting filtered low frequency components may then be combined with the filtered high frequency components to generate output pixel data that may be used to depict images on an electronic display. By performing the tri-lateral filtering process described herein, the image processing circuitry may reduce visual artifacts and banding visual effects from being depicted on the electronic display. Moreover, the tri-lateral filtering techniques described herein may provide improved image quality by identifying banding visual effects that occur within the most significant bits, as opposed to those that occur due to the least significant bits as attenuated by the bit depth expansion process described herein. Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
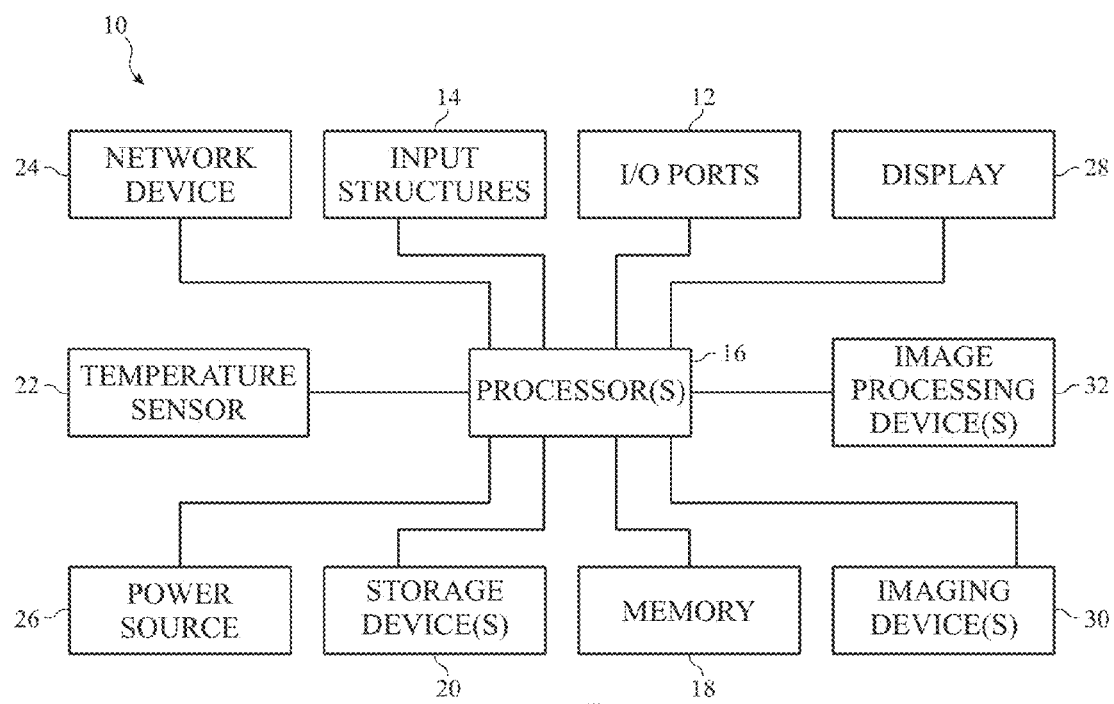
FIG. 1 is a simplified block diagram of components of an electronic device with imaging device(s) and image processing circuitry that may perform image processing, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "embodiments" of the present disclosure are not intended to be interpreted as excluding the existence of additional embodiments that also incorporate the recited features.

Image data (e.g., picture, video) depicted on a display of an electronic device may undergo significant processing to remove noise, sharpen images, and/or add detail to the image data that may be lost due to the image data being compressed at some time. This processing may improve the quality of the image(s) depicted on the display. For example, when an electronic device initially receives image data, the image data may be in a compressed format. Upon receiving the compressed data, the image processing circuitry within the electronic device may un-compress the image data, such that the image data may be depicted on the display. However, due to the compression of the image data, some details or data (e.g., bits) present in the original image data may not be present in the uncompressed image data. As a result, the image data depicted on the display may include some undesirable visual artifacts or effects such as banding. Banding generally refers to abrupt changes between shades of the same color. For instance, natural color gradients (e.g., sunsets, dawns or clear blue skies) depicted on a display may include abrupt changes in color shades at various locations instead of a smooth change color shade throughout the changes in the colors.

In certain embodiments, the image processing circuitry may include a debanding component that may filter or attenuate received image data based on an intensity difference between pixels and local spatial activity of pixels in the same area. The intensity difference between pixels may relate to an absolute difference between an intensity of a respective pixel and intensities of neighboring pixels of the respective pixel. The local spatial activity of the pixels may correspond to a sum of pixel differences in a region of the image data. With this in mind, the debanding component may receive pixel data, apply a bi-lateral filter to the pixel data, attenuate the pixel data based on the local intensity and the local activity of the pixel data, and blend the output of the bi-lateral filter with the attenuated pixel data to remove various types of visual artifacts (e.g., banding) from the image data. By using the local spatial activity of the pixel data to attenuate the image data, the debanding component may apply a third parameter, as compared to the bi-lateral filter, to attenuate undesired visual artifacts.

By way of introduction, FIG. 1 is a block diagram illustrating an example of an electronic device 10 that may process image data using one or more of the image processing techniques briefly mentioned above. The electronic device 10 may be any suitable electronic device, such as a laptop or desktop computer, a mobile phone, a digital media player, or the like, that can receive and process image data. By way of example, the electronic device 10 may be a portable electronic device, such as a model of an iPod® or iPhone®, available from Apple Inc. of Cupertino, Calif. The electronic device 10 may be a desktop or notebook computer, such as a model of a MacBook®, MacBook® Pro, MacBook Air®, iMac®, Mac® Mini, or Mac Pro®, available from Apple Inc. In other embodiments, electronic device 10 may be a model of an electronic device from another manufacturer that is capable of acquiring and processing image data.

Regardless of form, the electronic device 10 may process image data using one or more of the image processing techniques presented in this disclosure. The electronic device 10 may include or operate on image data acquired from one or more imaging devices, such as an integrated or external digital camera, on image data acquired from digital content providers via a network interface, or then like. Certain specific examples of the electronic device 10 will be discussed below with reference to FIGS. 2-5.

As shown in FIG. 1, the electronic device 10 may include various components. The functional blocks shown in FIG. 1 may represent hardware elements (including circuitry), software elements (including code stored on a computer-readable medium) or a combination of both hardware and software elements. In the example of FIG. 1, the electronic device 10 includes input/output (I/O) ports 12, input structures 14, one or more processors 16, a memory 18, nonvolatile storage 20, a temperature sensor 22, networking device 24, power source 26, display 28, one or more imaging devices 30, and image processing circuitry 32. It should be appreciated, however, that the components illustrated in FIG. 1 are provided only as an example. Other embodiments of the electronic device 10 may include more or fewer components. To provide one example, some embodiments of the electronic device 10 may not include the imaging device(s) 30. In any case, the image processing circuitry 32 may implement one or more of the image processing techniques discussed below. The image processing circuitry 32 may receive image data for image processing from the memory 18, the nonvolatile storage device(s) 20, the imaging device(s) 30, or any other suitable source.

Before continuing further, it should be noted that the system block diagram of the device 10 shown in FIG. 1 is intended to be a high-level control diagram depicting various components that may be included in such a device 10. That is, the connection lines between each individual component shown in FIG. 1 may not necessarily represent paths or directions through which data flows or is transmitted between various components of the device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU). In addition, the image processing circuitry 32 may communicate with the memory 18 directly via a direct memory access (DMA) bus.

Considering each of the components of FIG. 1, the I/O ports 12 may represent ports to connect to a variety of devices, such as a power source, an audio output device, or other electronic devices. For example, the I/O ports 12 may connect to an external imaging device, such as a digital camera, to acquire image data to be processed in the image processing circuitry 32. The input structures 14 may enable user input to the electronic device, and may include hardware keys, a touch-sensitive element of the display 28, and/or a microphone.

The processor(s) 16 may control the general operation of the device 10. For instance, the processor(s) 16 may execute an operating system, programs, user and application interfaces, and other functions of the electronic device 10. The processor(s) 16 may include one or more microprocessors and/or application-specific microprocessors (ASICs), or a combination of such processing components. For example, the processor(s) 16 may include one or more instruction set (e.g., RISC) processors, as well as graphics processors (GPU), video processors, audio processors and/or related chip sets. As may be appreciated, the processor(s) 16 may be coupled to one or more data buses for transferring data and instructions between various components of the device 10. In certain embodiments, the processor(s) 16 may provide the processing capability to execute an imaging applications on the electronic device 10, such as Photo Booth®, Aperture®, iPhoto®, Preview®, iMovie®, or Final Cut Pro® available from Apple Inc., or the "Camera" and/or "Photo" applications provided by Apple Inc. and available on some models of the iPhone®, iPod®, and iPad®.

A computer-readable medium, such as the memory 18 or the nonvolatile storage 20, may store the instructions or data to be processed by the processor(s) 16. The memory 18 may include any suitable memory device, such as random access memory (RAM) or read only memory (ROM). The non-volatile storage 20 may include flash memory, a hard drive, or any other optical, magnetic, and/or solid-state storage media. The memory 18 and/or the nonvolatile storage 20 may store firmware, data files, image data, software programs and applications, and so forth. Such digital information may be used in image processing to control or supplement the image processing circuitry 32.

In some examples of the electronic device 10, the temperature sensor 22 may indicate a temperature associated with the imaging device(s) 30. Since fixed pattern noise may be exacerbated by higher temperatures, the image processing circuitry 32 may vary certain operations to remove fixed pattern noise depending on the temperature. The network device 24 may be a network controller or a network interface card (NIC), and may enable network communication over a local area network (LAN) (e.g., Wi-Fi), a personal area network (e.g., Bluetooth), and/or a wide area network (WAN) (e.g., a 3G or 4G data network). The power source 26 of the device 10 may include a Li-ion battery and/or a power supply unit (PSU) to draw power from an electrical outlet.

The display 28 may display various images generated by device 10, such as a GUI for an operating system or image data (including still images and video data) processed by the image processing circuitry 32. The display 28 may be any suitable type of display, such as a liquid crystal display (LCD), plasma display, or an organic light emitting diode (OLED) display, for example. Additionally, as mentioned above, the display 28 may include a touch-sensitive element that may represent an input structure 14 of the electronic device 10.

The imaging device(s) 30 of the electronic device 10 may represent a digital camera that may acquire both still images and video. Each imaging device 30 may include a lens and an image sensor capture and convert light into electrical signals. By way of example, the image sensor may include a CMOS image sensor (e.g., a CMOS active-pixel sensor (APS)) or a CCD (charge-coupled device) sensor. Generally, the image sensor of the imaging device 30 includes an integrated circuit with an array of photodetectors. The array of photodetectors may detect the intensity of light captured at specific locations on the sensor. Photodetectors are generally only able to capture intensity, however, and may not detect the particular wavelength of the captured light.

The image processing circuitry 32 may provide many image processing steps such as color processing, noise reduction, and so forth. In some embodiments, the image processing circuitry 32 may include various subcomponents and/or discrete units of logic that collectively form an image processing "pipeline" for performing each of the various image processing steps. These subcomponents may be implemented using hardware (e.g., digital signal processors or ASICs) or software, or via a combination of hardware and software components. The various image processing operations that may be provided by the image processing circuitry 32 will be discussed in greater detail below.

Figure 2:
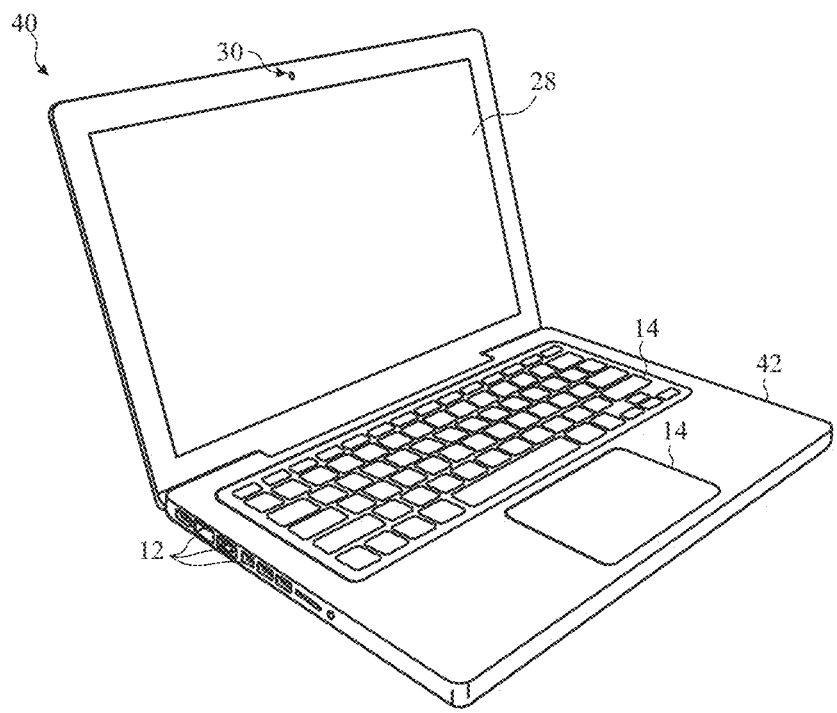
FIG. 2 is a perspective view of the electronic device of FIG. 1 in the form of a notebook computing device, in accordance with an embodiment.

As mentioned above, the electronic device 10 may take any number of suitable forms. Some examples of these possible forms appear in FIGS. 2-5. Turning to FIG. 2, a notebook computer 40 may include a housing 42, the display 28, the I/O ports 12, and the input structures 14. The input structures 14 may include a keyboard and a touchpad mouse that are integrated with the housing 42. Additionally, the input structure 14 may include various other buttons and/or switches which may be used to interact with the computer 40, such as to power on or start the computer, to operate a GUI or an application running on the computer 40, as well as adjust various other aspects relating to operation of the computer 40 (e.g., sound volume, display brightness, etc.). The computer 40 may also include various I/O ports 12 that provide for connectivity to additional devices, as discussed above, such as a FireWire® or USB port, a high definition multimedia interface (HDMI) port, or any other type of port that is suitable for connecting to an external device. Additionally, the computer 40 may include network connectivity (e.g., network device 26), memory (e.g., memory 20), and storage capabilities (e.g., storage device 22), as described above with respect to FIG. 1.

The notebook computer 40 may include an integrated imaging device 30 (e.g., a camera). In other embodiments, the notebook computer 40 may use an external camera (e.g., an external USB camera or a "webcam") connected to one or more of the I/O ports 12 instead of or in addition to the integrated imaging device 30. For instance, an external camera may be an iSight® camera available from Apple Inc. Images captured by the imaging device 30 may be viewed by a user using an image viewing application, or may be used by other applications, including video-conferencing applications, such as iChat®, and image editing/viewing applications, such as Photo Booth®, Aperture®, iPhoto®, or Preview®, which are available from Apple Inc. In certain embodiments, the depicted notebook computer 40 may be a model of a MacBook®, MacBook® Pro, MacBook Air®, or PowerBook® available from Apple Inc. In other embodiments, the computer 40 may be portable tablet computing device, such as a model of an iPad® from Apple Inc.

Figure 3:
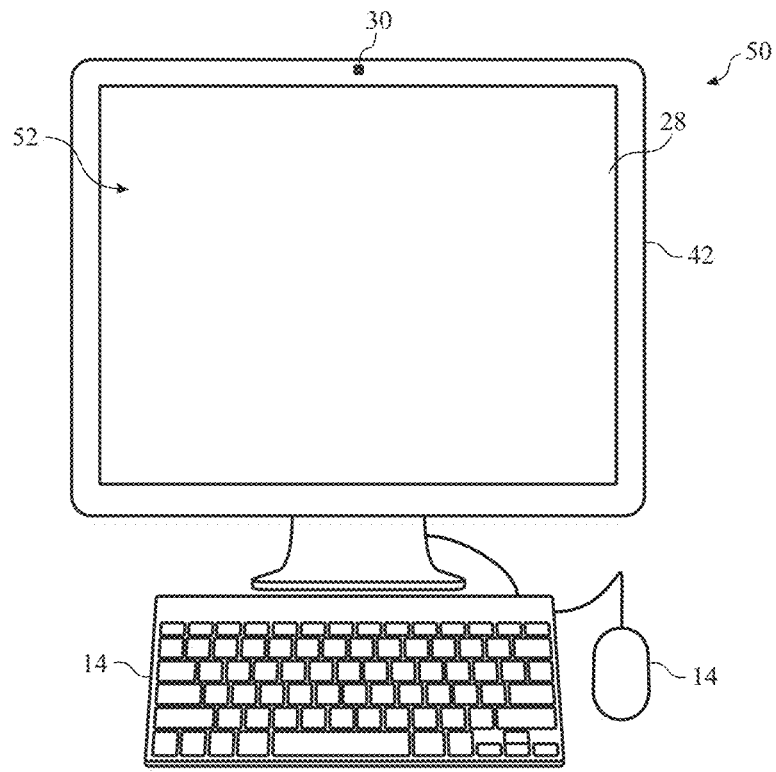
FIG. 3 is a front view of the electronic device of FIG. 1 in the form of a desktop computing device, in accordance with an embodiment.

FIG. 3 shows the electronic device 10 in the form of a desktop computer 50. The desktop computer 50 may include a number of features that may be generally similar to those provided by the notebook computer 40 shown in FIG. 4, but may have a generally larger overall form factor. As shown, the desktop computer 50 may be housed in an enclosure 42 that includes the display 28, as well as various other components discussed above with regard to the block diagram shown in FIG. 1. Further, the desktop computer 50 may include an external keyboard and mouse (input structures 14) that may be coupled to the computer 50 via one or more I/O ports 12 (e.g., USB) or may communicate with the computer 50 wirelessly (e.g., RF, Bluetooth, etc.). The desktop computer 50 also includes an imaging device 30, which may be an integrated or external camera, as discussed above. In certain embodiments, the depicted desktop computer 50 may be a model of an iMac®, Mac® mini, or Mac Pro®, available from Apple Inc.

Figure 4:
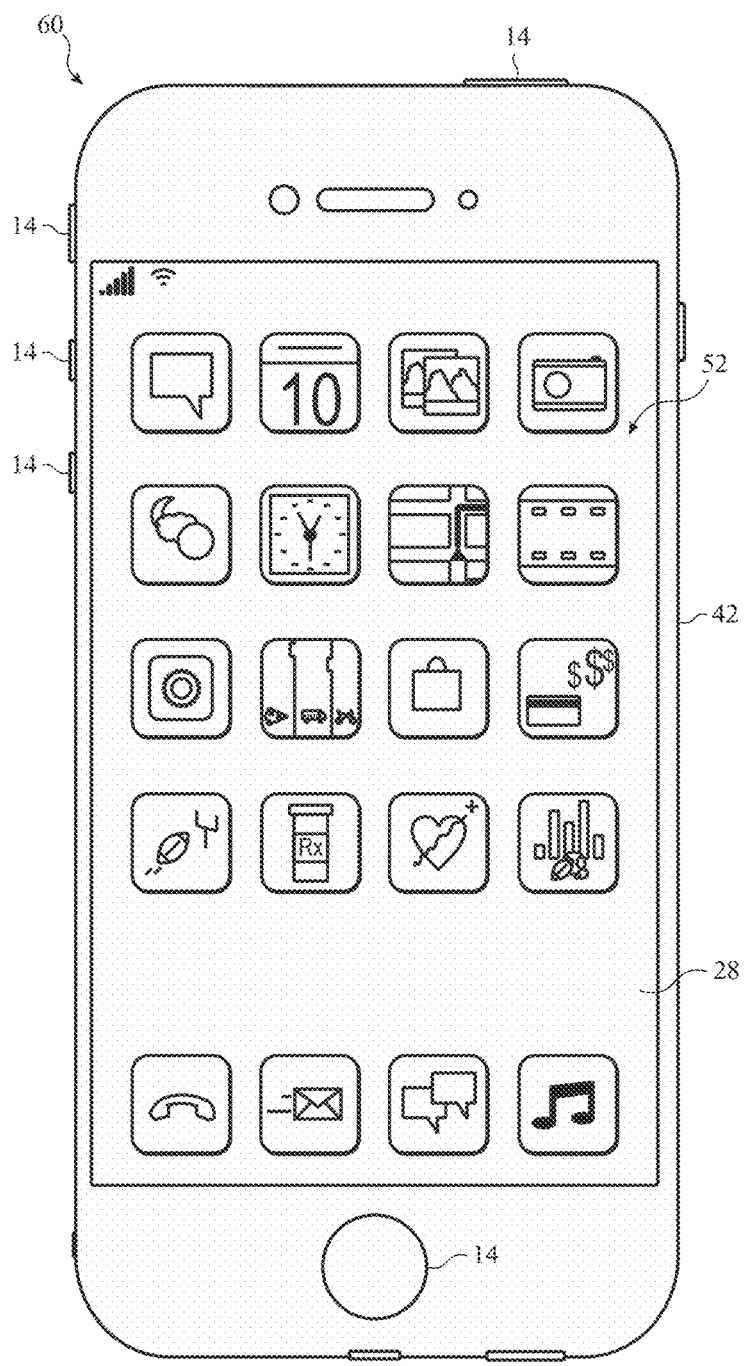
FIG. 4 is a front view of the electronic device of FIG. 1 in the form of a handheld portable electronic device, in accordance with an embodiment.
Figure 5:
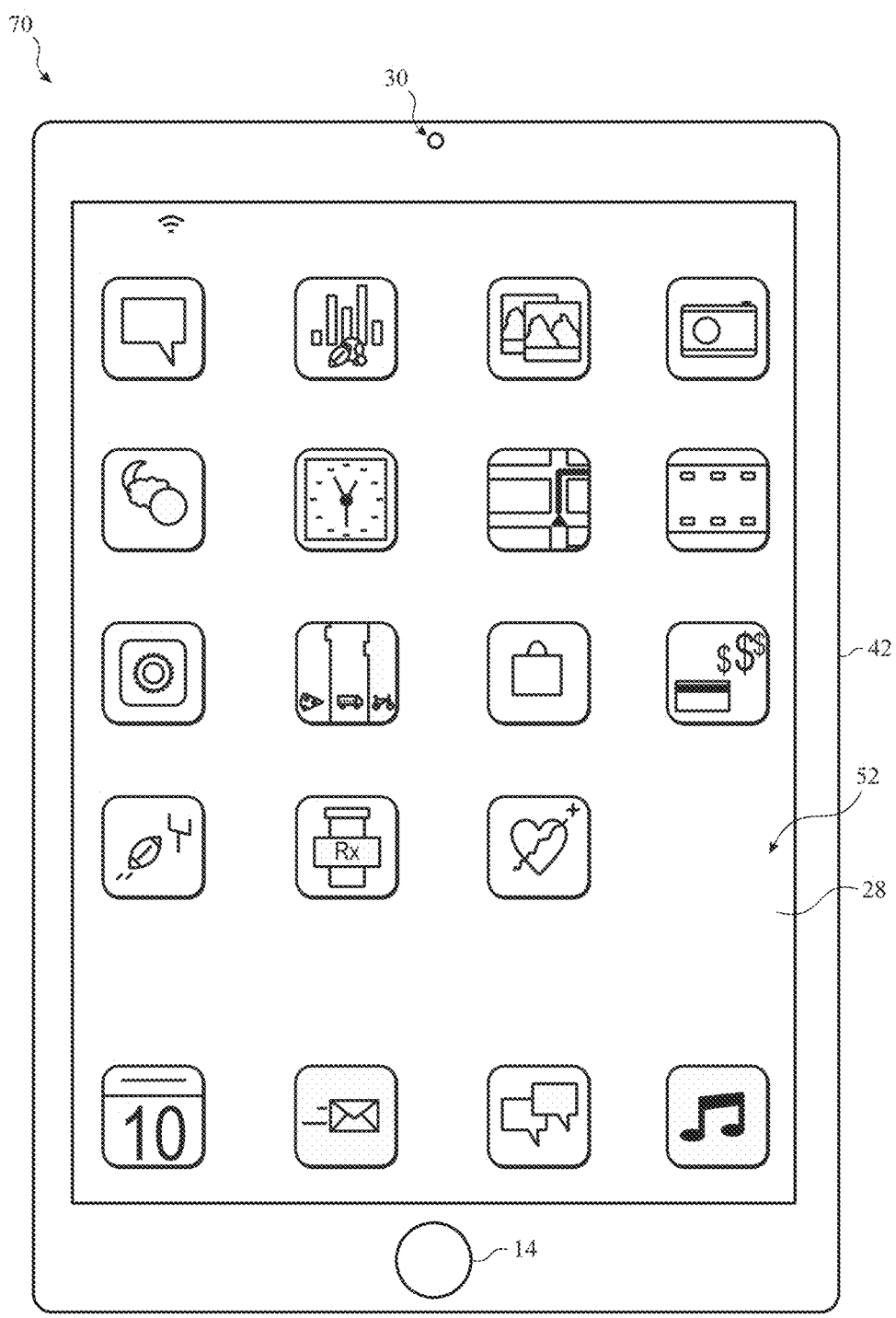
FIG. 5 is a front view of the electronic device of FIG. 1 in the form of a tablet computing device, in accordance with an embodiment.

The electronic device 10 may also take the form of portable handheld device 60 or 70 or 70, as shown in FIGS. 4 and 5. By way of example, the handheld device 60 or 70 may be a model of an iPod® or iPhone® available from Apple Inc. The handheld device 60 or 70 includes an enclosure 42, which may function to protect the interior components from physical damage and to shield them from electromagnetic interference. The enclosure 42 also includes various user input structures 14 through which a user may interface with the handheld device 60 or 70. Each input structure 14 may control various device functions when pressed or actuated. As shown in FIG. 5, the handheld device 60 or 70 may also include various I/O ports 12. For instance, the depicted I/O ports 12 may include a proprietary connection port 12a for transmitting and receiving data files or for charging a power source 26 and an audio connection port 12b for connecting the device 60 or 70 to an audio output device (e.g., headphones or speakers). Further, in embodiments where the handheld device 60 or 70 provides mobile phone functionality, the device 60 may include an I/O port 12c for receiving a subscriber identify module (SIM) card.

The display device 28 may display images generated by the handheld device 60 or 70. For example, the display 28 may display system indicators that may indicate device power status, signal strength, external device connections, and so forth. The display 28 may also display a GUI 52 that allows a user to interact with the device 60 or 70, as discussed above with reference to FIG. 3. The GUI 52 may include graphical elements, such as the icons which may correspond to various applications that may be opened or executed upon detecting a user selection of a respective icon.

As mentioned above, image data acquired using the imaging device 30 or elsewhere may be processed using the image processing circuitry 32, which may include hardware (e.g., disposed within the enclosure 42) and/or software stored on one or more storage devices (e.g., memory 18 or nonvolatile storage 20) of the device 60 or 70. Images acquired using the camera application and the imaging device 30 may be stored on the device 60 or 70 (e.g., in the nonvolatile storage 20) and may be viewed at a later time using a photo viewing application.

Having provided some context with regard to possible forms that the electronic device 10 may take, the present discussion will now focus on the image processing circuitry 32 shown in FIG. 1. As mentioned above, the image processing circuitry 32 may be implemented using hardware and/or software components, and may include various processing units that define an image signal processing (ISP) pipeline.

Image Processing Circuitry

Figure 6:
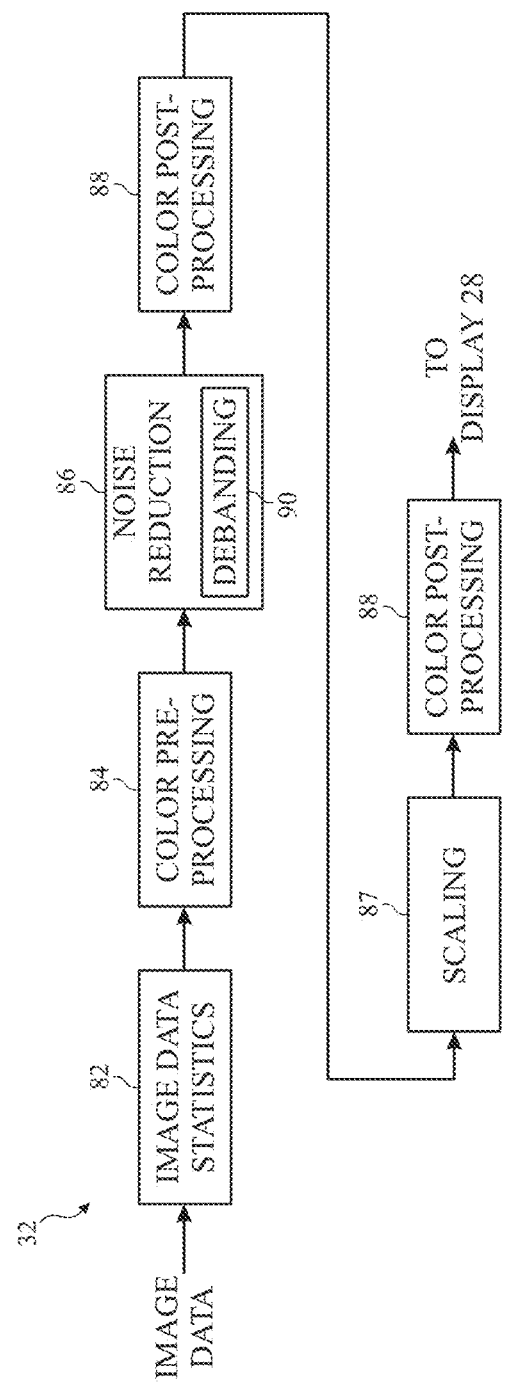
FIG. 6 is a block diagram of the image processing circuitry of FIG. 1, in accordance with an embodiment.

Referring now to FIG. 6, the image processing circuitry 32 may receive image data from any suitable source and may process the image data, such that the processed image data may be depicted by the display 28. In certain embodiments, the image processing circuitry 32 may include a number of components that may perform different types of image processing operations. For example, the image processing circuitry 32 may include an image data statistics component 82, a color pre-processing component 84, a noise reduction component 86, a scaling component 87, a color post-processing component 88, and the like. It should be noted that the components described as being part of the image processing circuitry 32 are merely provided as example types of processing components that may be part of the image processing circuitry 32. It should be understood that the image processing circuitry 32 may have any combination of the components listed above and/or additional components that are not described in this disclosure. Moreover, it should be noted that the components illustrated in FIG. 6 may be implemented in any suitable order and is not limited to the order presented in the figure.

Referring back to FIG. 6, the image data statistics 82 may collect various types of statistics related to the received image data. The color pre-processing component 84 may perform a number of conversions (e.g., 4:4:4 conversion, YUV to XYZ, XYZ to YUV conversion, 4:2:2 conversion), color stretch operations, or the like on the image data. The noise reduction component 86 may remove various types of noise that may be present in the image data. The noise may be caused by various factors including the manner in which the image data was compressed, the pre-processing operations performed at the color pre-processing component 84, or the like. The noise reduction component 86 may include, for example, a spatial noise filter, a temporal noise filter, a Moving Picture Experts Group (MPEG) artifact remover filter, a debanding component 90, and the like. After the noise has been attenuated on the image data, the processed image data may be input into the scaling component 87, which may scale the image data to a desired format. Afterwards the color post-processing component 88 may convert the processed image data into a format that may be interpretable by a graphics-processing unit (GPU) or the display 28.

In one embodiment, the debanding component 90 of the noise reduction component 86 may remove banding visual effects from the image data. As mentioned above, banding visual effects correspond to locations in an image depicted on the display 28 where abrupt changes between shades of the same color occur. For instance, natural color gradients (e.g., sunsets, dawns or clear blue skies) depicted on a display may include abrupt changes in color shades at various locations instead of a smooth change color shade throughout the changes in the colors. Banding may occur in image data due to video compression techniques, when the image source is created for a standard definition resolution (SDR) display (e.g., ~100 nits), directly displaying SDR contents on a high definition resolution (HDR) display (e.g., 1000 nits ~4000 nits), when a bit width is not enough in uncompressed image data (e.g., in 8-bit YUV space, banding may appear in a dark sky), poor video processing techniques, and the like.

Figure 7:
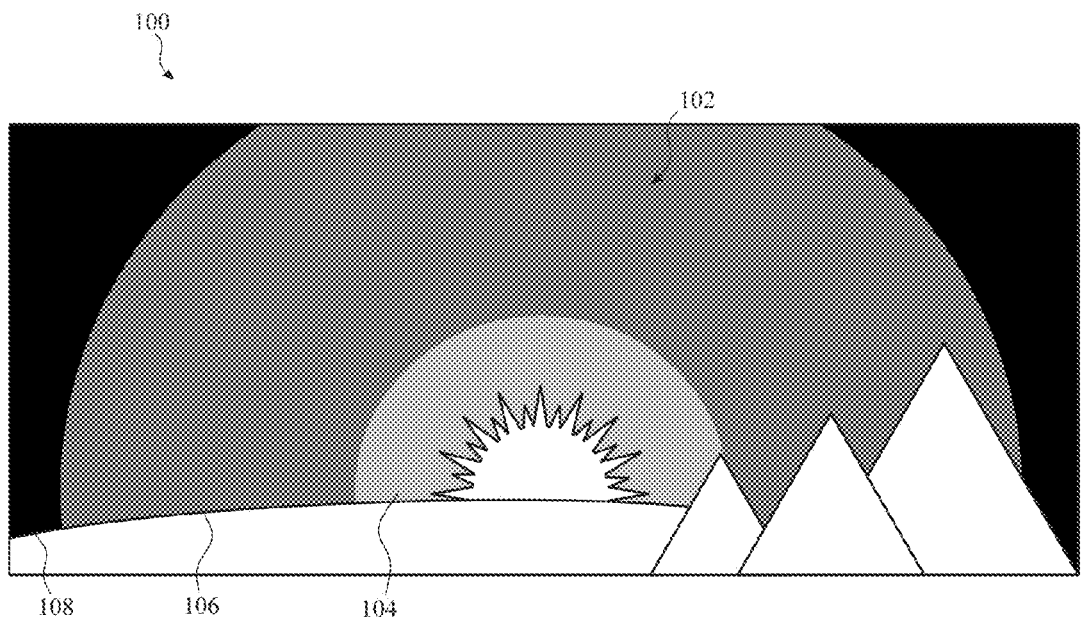
FIG. 7 is an illustration depicting banding visual effects present on an image depicted on a display of the electronic device of FIG. 1, in accordance with an embodiment.
Figure 8:
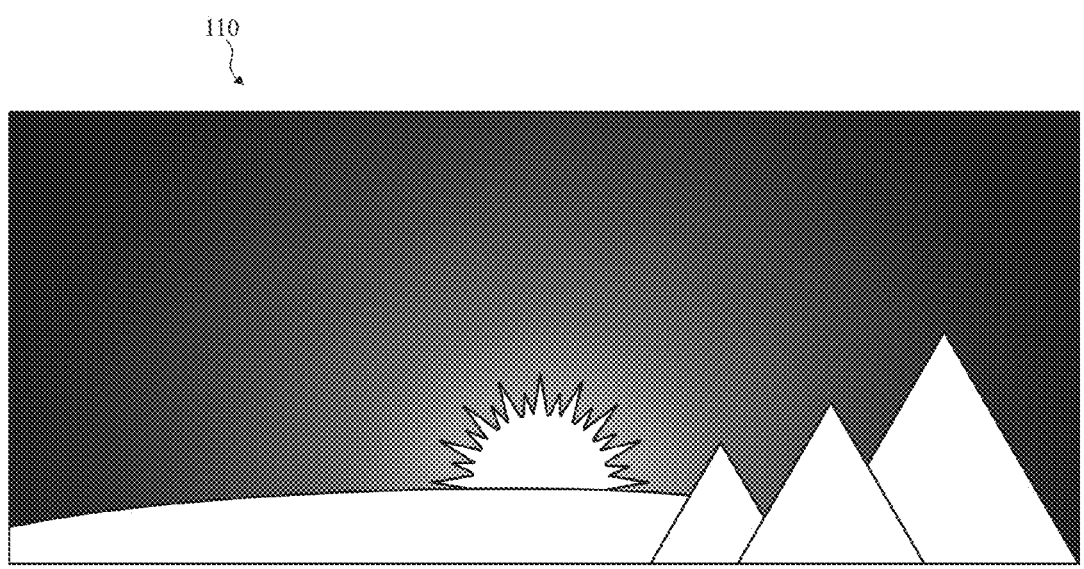
FIG. 8 is an illustration depicting an image depicted on a display of the electronic device of FIG. 1, such that the banding visual effects that may have been present on the corresponding image data are attenuated using the image processing circuitry of FIG. 6, in accordance with an embodiment.

By way of example, FIG. 7 illustrates an example image 100 that may be depicted on the display 28. The example image 100 of FIG. 7 includes shading 102 may correspond to colors of a horizon. As shown in the image 100, color banding may cause the shading 102 of the image 100 to be disjointed. That is, the shading 102 may include a first region of shading 104, a second region of shading 106, a third region of shading 108, and so forth. As can be appreciated, these regions of shading do not reflect how the color shades of a horizon are seen through human eyes. However, due to pixel data being lost when received image data is processed (e.g., un-compression), the transitions between the shading 102 of the image 100 include banding visual effects. However, by using the debanding component 90 and the corresponding techniques described herein, the same image data depicted in the example image 100 of FIG. 7 may be depicted with smooth shading transitions as shown in the example image 110 of FIG. 8.

Figure 9:
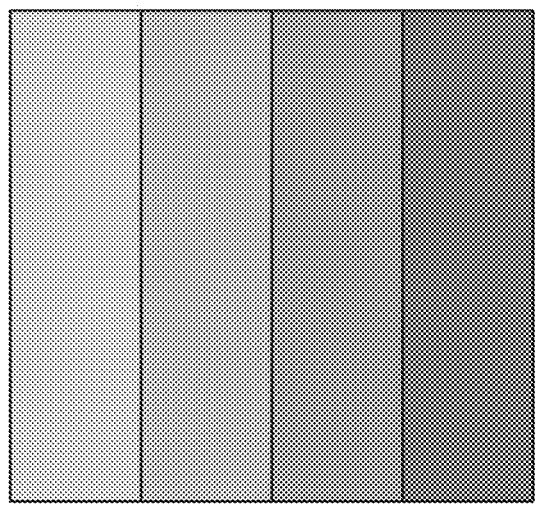
FIG. 9 is an illustration depicting banding visual effects present on an intensity component of a single color component on a display of the electronic device of FIG. 1, in accordance with an embodiment.
Figure 10:
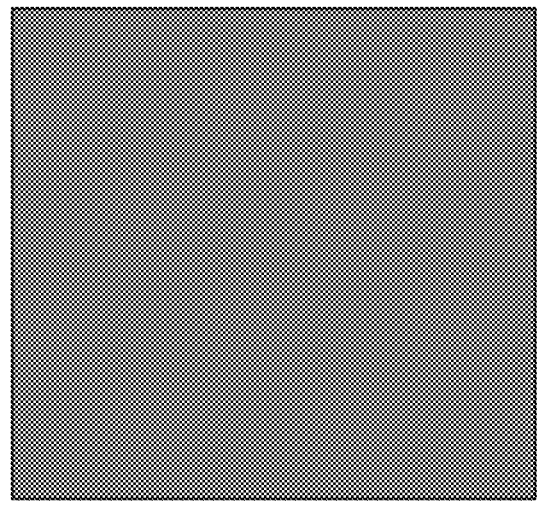
FIG. 10 is an illustration depicting the single color component of FIG. 9, such that the banding visual effects that may have been present on the intensity component is attenuated using the image processing circuitry of FIG. 6, in accordance with an embodiment.

In addition to the banding visual effects described above, the banding may actually occur as changes of an individual color component. For example, in red-green-blue (RGB) color space, banding may occur in each color component and the debanding techniques described herein may be applied to each color component individually. Similarly, in a YUV space, the debanding techniques may be applied to each Y-U-V component individually. For instance, FIG. 9 illustrates a banding visual effect that may occur in an intensity component of a single color component. In the same manner as FIG. 8 above, the same intensity component depicted in FIG. 9 may be attenuated using the techniques described herein, as shown in FIG. 10.

Furthermore, a color transformation may occur between the RGB color space to the YUV color space or some other color transform before debanding is applied. As such, the debanding techniques may be applied to each individual color space or applied to a particular color space in which debanding may be determined to be the most effective. In the same manner, in certain embodiments, color components may be transformed from a 4:2:0 format to a 4:4:4 format before applying debanding to provide more effective debanding results.

Figure 11:
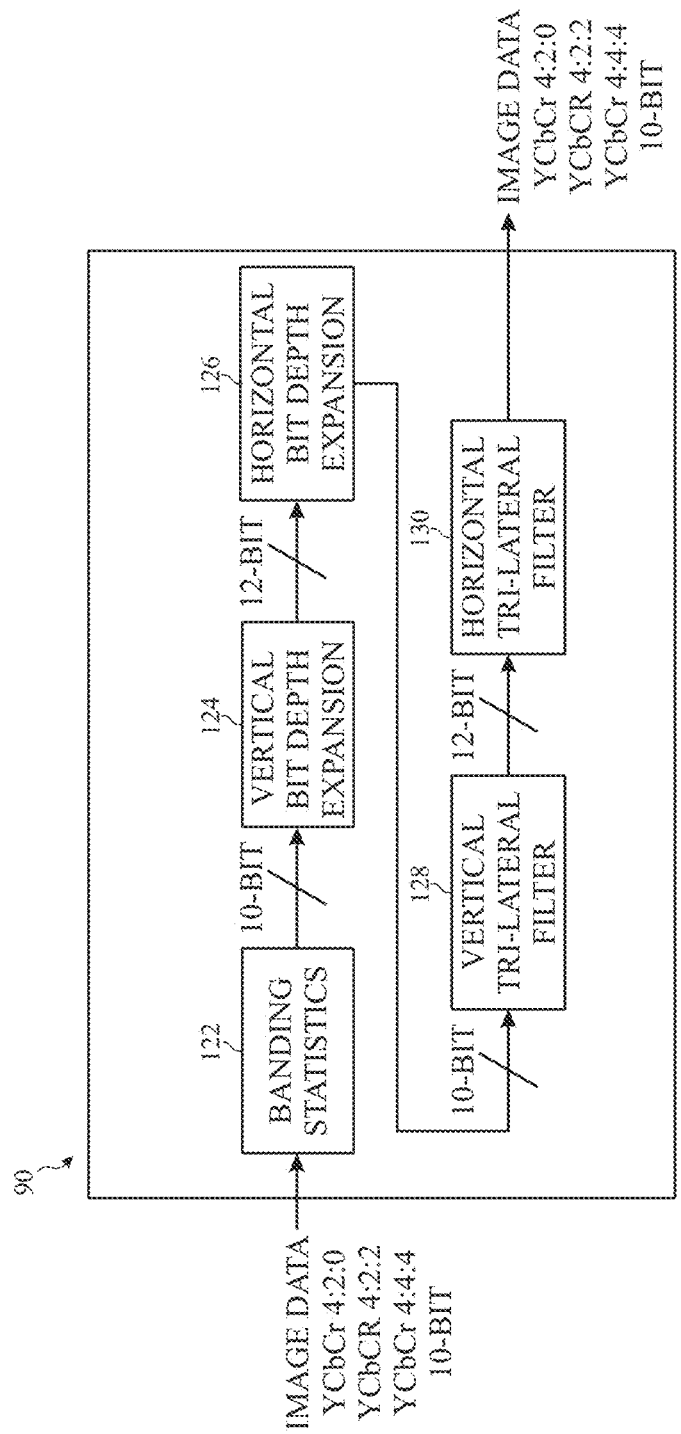
FIG. 11 is a block diagram of a debanding component in the image processing circuitry of FIG. 6, in accordance with an embodiment.

With the foregoing in mind, FIG. 11 illustrates a block diagram of various components that may be part of the debanding component 90. As shown in FIG. 11, the debanding component 90 may include a banding statistics component 122, a vertical bit depth expansion (BDE) component 124, a horizontal BDE component 126, a vertical tri-lateral filter (TLF) 128, and a horizontal TLF 130.

The banding statistics component 122 may collect information about the bands that may be present in the received image data, information related to the quantization step size of the received image data, or the like. In one embodiment, the banding statistics component 122 may receive statistics that may be passed in as auxiliary data from a video decoder that contains information regarding the original bit depth and/or the quantization values and block sizes where the quantization and transform of the image data are performed. This information may help tune the BDE component 124 and the TLF component 130 to operate more effectively. If auxiliary statistics are not available from a video decoder, a statistics generating component may be added to the debanding component 90 or separate from the debanding component 90 to estimate quantization noise variance, which may then be used to tune the BDE component 124 and the TLF component 130. It should be noted that when the statistics are passed from a video decoder as auxiliary data, the statistics may be frame-based, regional-based, and/or macro-block based.

In certain embodiments, the banding statistics component 122 may determine banding characteristics of image data prior to codec encoding of the image data. That is, the banding statistics component 122 may first compute a difference between pixels at multiples of 4 pixels. 4 pixels are used because many codecs are based upon transforms that are a size, which is a multiple of 4. After determining the difference, the banding statistics component 122 may form a histogram based on the above computed differences. Using the histogram, the banding statistics component 122 may determine a probability for a difference between pixels as a codec-induced artifact or an actual feature. The banding statistics component 122 may use the computed probability to determine a threshold for artifact removal, as will be described below with regard to, for instance, the TLF component 130.

After information is collected by the banding statistics component 122, the vertical BDE component 124 and the horizontal BDE component 126 may interpolate missing least significant bits that may be missing from pixel data in the received image data. The vertical BDE component 124 may identify pixels that may be part of a band along the same column as a respective pixel and the horizontal BDE component 124 may identify pixels that may be part of a band along the same row as a respective pixel. After identifying the pixels that are part of a band, both BDE components may expand the bit depth (e.g., from 8-bit to 10-bit, from 10-bit to 12-bit) of certain pixels that are located between detected bands or within a band. That is, the vertical BDE component 124 may perform bit depth expansion interpolation for pixels located in bands detected along a vertical line of pixels in the image data. In the same manner, the horizontal BDE component 126 may perform bit depth expansion interpolation for pixels located in bands detected along a horizontal line of pixels in the image data. Additional details regarding the bit depth expansion process performed by the vertical BDE component 124 and the horizontal BDE component 126 will be described below with reference to FIGS. 12-15.

After the bit depth of certain pixels are expanded via the vertical BDE component 124 and the horizontal BDE component 126, the resulting image data may be processed by the vertical TLF component 128 and the horizontal TLF component 130. The vertical TLF component 128 and the horizontal TLF component 130 may perform a pixel adaptive low-pass filter to further reduce bands and block artifacts caused by compression and/or quantization of the image data. Additional details regarding the filtering process performed by the vertical TLF component 128 and the horizontal TLF component 130 will be described below with reference to FIGS. 16-20.

Referring back to the vertical BDE component 124 and the horizontal BDE component 126, these components may interpolate the lower n (e.g., n<=5) bits of a pixel value that corresponds to a pixel that is along the same column or row of a detected band. In one embodiment, to perform the interpolation of the lower order bits, bands on either side of an input pixel (i.e., either vertical for the horizontal pass or horizontal for the vertical pass) are detected. Generally, after two bands on one side of the input pixel are detected, the respective BDE component may use average pixel values of the pixels located in the band and the number of pixels that are identified as being part of the band to interpolate the lower order bits for the input pixel. This process is repeated for each pixel in the image data. As a result, the vertical BDE component 124 and the horizontal BDE component 126 may provide a spatially varying filter that attenuates certain visual effects, such as banding. In other words, since the window or range of pixels used to interpolate a new pixel value for each respective pixel depends on respective distances between each respective pixel and another pixel that is part of a band, the vertical BDE component 124 and the horizontal BDE component 126 filters or interpolates data for missing details in the respective pixel based on spatially varying variables. Additional details regarding how the vertical BDE component 124 and the horizontal BDE component 126 implements this spatially varying filter will now be discussed with respect to FIGS. 12-15.

It should be noted that if the banding is introduced due to insufficient bit precision, the debanding component 90 may use the vertical BDE component 124 and the horizontal BDE component 126 to interpolate lower order bits of the input pixel. However, if the banding is caused by video-processing (e.g., video compression), the debanding component 90 may interpolate additional bits such as the mid significant bits for the input pixel.

Bit Depth Expansion

Figure 12:
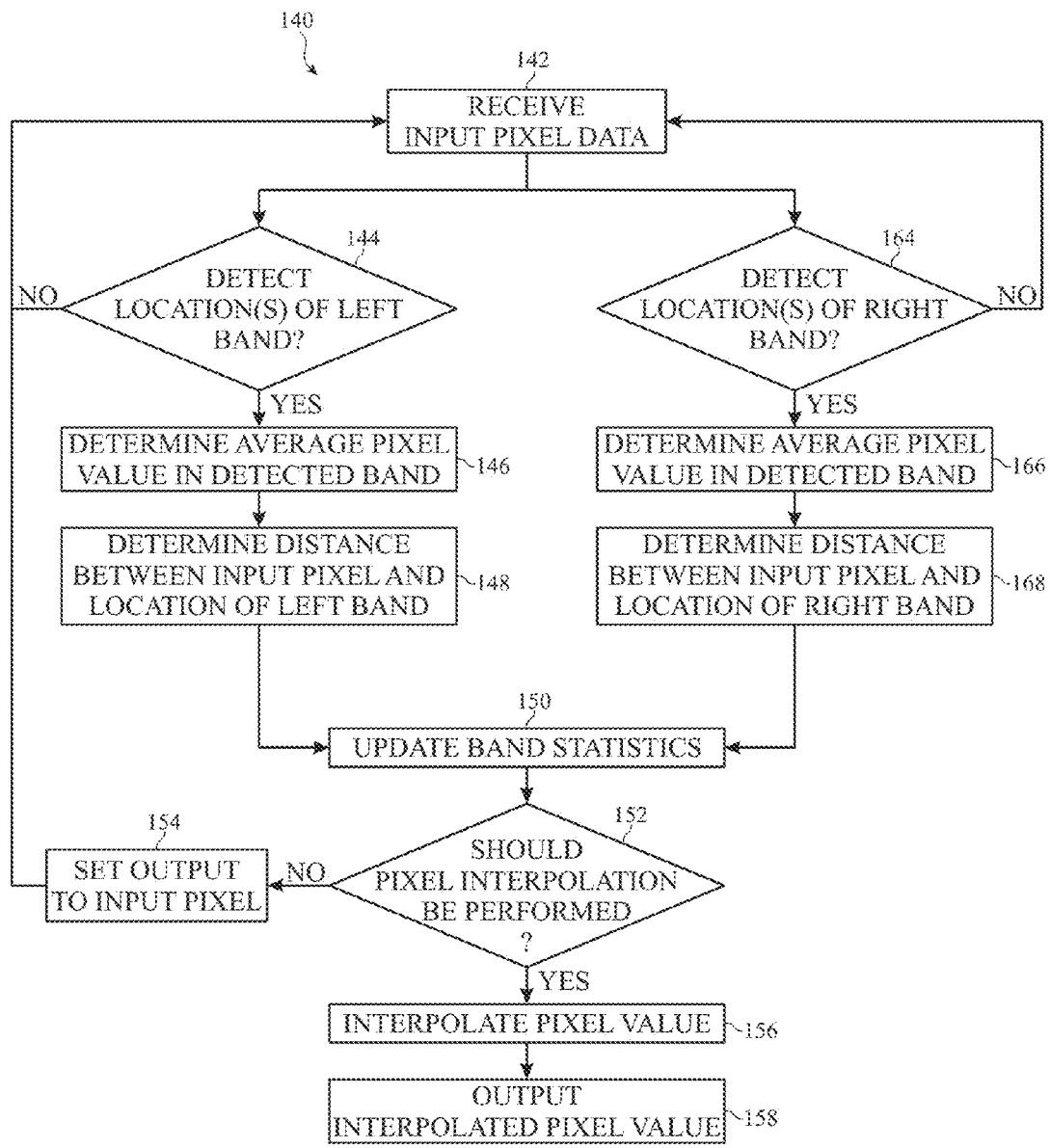
FIG. 12 is a flow chart of a method for attenuating banding effects in image data, in accordance with an embodiment.

FIG. 12 illustrates a method 140 for performing a bit depth expansion process for attenuating banding visual effects in image data. In one embodiment, the vertical BDE component 124 and/or the horizontal BDE component 126 may perform the method 140 described herein. In certain embodiments, when performing the method 140 using the vertical BDE component 124 and/or the horizontal BDE component 126, a full frame of image data may be stored in a buffer to identify bands in the horizontal and vertical directions with respect to an input pixel. However, to reduce an amount of hardware involved in performing the method 140, a buffer smaller than one capable of storing the full frame of image data may be used. For example, a buffer capable of storing 128 lines of image data may be used to perform the bit depth expansion process described herein. In this example, for each input pixel, 64 lines of image data above the respective input pixel and 64 lines of image data below the respective input pixel may be stored in a buffer and may be used to perform the method 140 described herein.

It should be understood that the number of lines of image data stored in the buffer is variable and may depend on a type of memory used in conjunction with the image processing circuitry 32. For instance, in certain embodiments, the buffer may include data related to pixels that are part of a portion, such as a tile area or columns of pixels, of the image data. In this way, the method 140 may be performed with regard to each portion of the image data. Moreover, as will be further discussed below, it should be noted that, in another embodiment, the buffer used to perform the bit depth expansion techniques described herein may include 64 lines of data after a respective pixel and one line of image data that includes cumulative or accumulated data regarding previous lines of image data.

For the purposes of facilitating a discussion of the method 140, the following description of the method 140 will be described with reference to the horizontal BDE component 126 and identifying bands in the horizontal direction. However, it should be understood that the same method 140 may be employed by the vertical BDE component 124 using the buffer of image data described above.

Referring now to FIG. 12, at block 142, the horizontal BDE component 126 may receive input pixel data for a particular pixel (i.e., current pixel) in the received image data. The input pixel data may correspond to a pixel intensity value associated with the current pixel.

Figure 13:
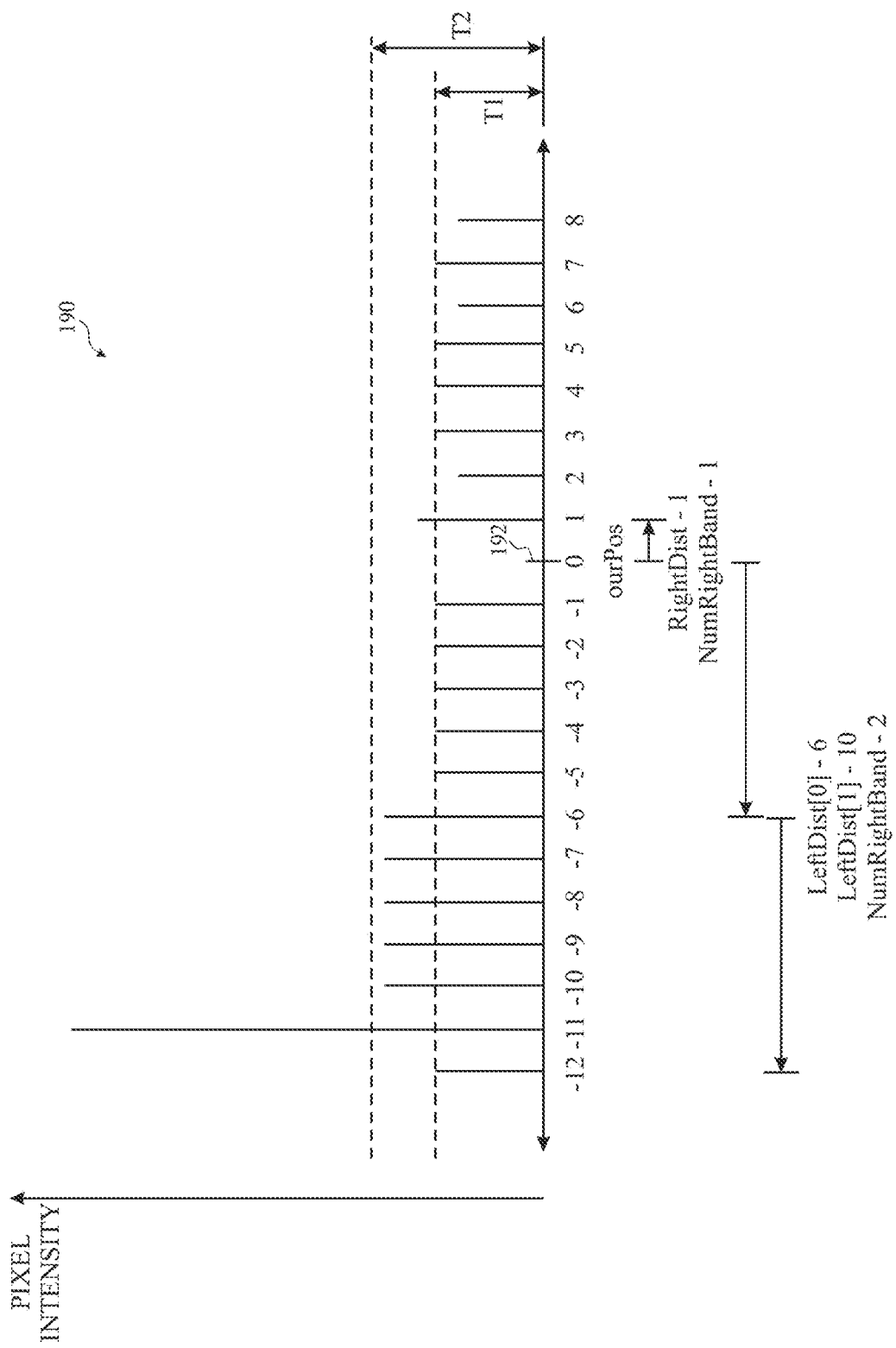
FIG. 13 is a graph of pixel intensities for a number of pixels that may be part of the display in the electronic device of FIG. 1, in accordance with an embodiment.

At block 144, the horizontal BDE component 126 may determine whether one or more bands are present to the left of the current pixel. By way of example, FIG. 13 illustrates a graph 190 of pixel intensities for a row of pixels in the received image data. As shown in FIG. 13, a current pixel 192 may be located at the 0 position mark of the graph 190. As such, at block 144, the horizontal BDE component 126 may determine whether one or more bands exist to the left of the current pixel 192 or in the negative direction with respect to the current pixel 192, as shown in FIG. 13.

Figure 14:
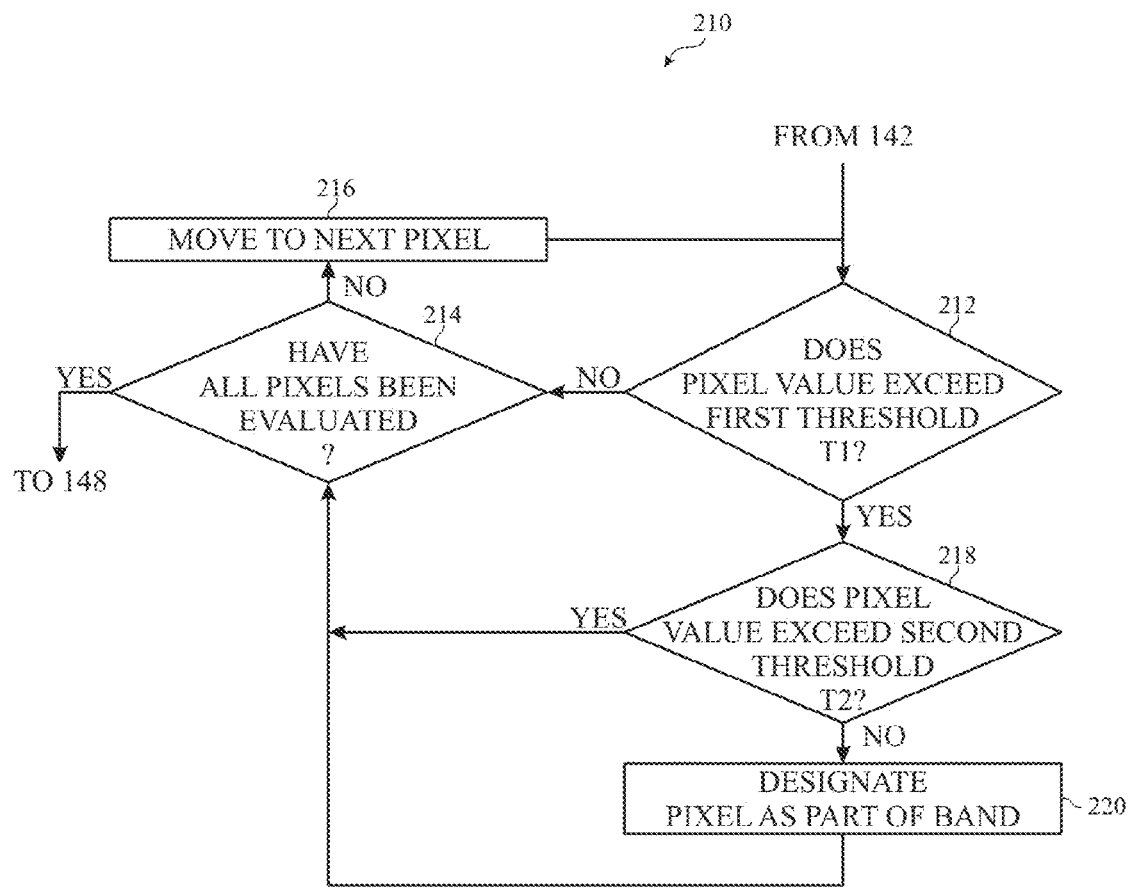
FIG. 14 is a flow chart of a method for determining a location of a band in image data, in accordance with an embodiment.

FIG. 14 illustrates an example flow chart of a method 210 for detecting a band location with respect to a location of the current pixel 192. At block 212, the horizontal BDE component 126 may evaluate a pixel value of another pixel located a certain number of pixels away from the current pixel 192. In the present discussion of the method 210, the horizontal BDE component 126 may evaluate each pixel value located to the left of the current pixel 192. However, it should be noted that the method 210 may be performed in any direction (e.g., right, up, or down).

Initially, the horizontal BDE component 126 may evaluate a pixel value that is one pixel away from the current pixel 192 in the left direction. After the horizontal BDE component 126 has performed the method 210 with respect to a respective pixel, the horizontal BDE component 126 may then move on to another pixel that has yet to be evaluated and repeat the method 210 for the new pixel.

With the foregoing in mind and referring back to block 212, the horizontal BDE component 126 may determine whether the respective pixel value of the respective pixel located a number of pixels away from the current pixel exceeds a first threshold T1. The first threshold T1 may be used to identify pixels that are part of a band. In certain embodiments, the first threshold T1 may be determined based on known data regarding the properties of the display 28, statistics associated with the received image data, or the like. In other embodiments, the first threshold T1 may be determined dynamically while the image data statistics component 82 and/or the banding statistics components are gathering information. Generally, the first threshold T1 may be based on a number of bits in which the original pixel data (e.g., before being compressed) was quantized. That is, the first threshold T1 may be based on a number of expected bits in the current pixel value. In any case, if the respective pixel value of the respective pixel being evaluated does not exceed the first threshold T1, the horizontal BDE component 126 may proceed to block 214 and determine whether all of the pixels in one direction of the current pixel have been evaluated. If all of the pixels have not been evaluated, the horizontal BDE component 126 may proceed to block 216 and begin evaluating the next pixel adjacent to the current pixel previously being evaluated.

Referring back to block 212, if the respective pixel value of the respective pixel being evaluated does exceed the first threshold T1, the horizontal BDE component 126 may proceed to block 218. At block 218, the horizontal BDE component 126 may determine whether the respective pixel value exceeds a second threshold T2. The second threshold T2 may correspond to a pixel value that may not be associated with a band; instead, the second threshold T2 may denote desired image data. As such, the detected band may correspond to a pixel that exceeds the first threshold T1 but does not exceed the second threshold T2. If the respective pixel value does not exceed the second threshold T2, the horizontal BDE component 126 may proceed to block 220 and designate the respective pixel as being part of a band. The horizontal BDE component 126 may then store location information regarding the respective pixel in a memory or the like. In one embodiment, the horizontal BDE component 126 may store a distance from the current pixel and the respective pixel, as well as a respective pixel value, in the memory. After storing the relevant data, the horizontal BDE component 126 may proceed to block 214 and determine whether all of the pixels in a particular direction have been evaluated.

If, at block 218, the respective pixel value does exceed the second threshold T2, the horizontal BDE component 126 may proceed to block 214. As mentioned above, at block 214, the horizontal BDE component 126 may determine whether additional pixels exist in the direction that bands are being detected. If additional pixels should be evaluated, the horizontal BDE component 126 may proceed to block 216, which involves moving to the next pixel and performing the method 210 with respect to the new pixel. If, at block 214, all of the pixels in the specified direction have been evaluated, the horizontal BDE component 126 may exit the method 210 and proceed to block 146 of the method 140.

By way of example, referring to FIG. 13, if the method 210 is performed in the left direction with respect to the current pixel 192, a band may be detected 6 pixels away (−6) from the current pixel 192 since the corresponding pixel value exceeds the first threshold T1. As shown in FIG. 13, the band continues to be present 7, 8, 9, and 10 pixels away from the current pixel 192. However, at 11 pixels away (−11), the respective pixel includes a pixel value that is greater than the second threshold T2. As discussed above, the second threshold T2 may be used to distinguish between bands and actual features or details of the image data. As such, the distance of the band may correspond to the location of the first detected band (−6) and the pixel immediately preceding the pixel that exceeds the second threshold T2 (−10).

With the foregoing in mind, the following pseudo code illustrates one embodiment in which the block 144 of the method 140 may be performed. That is, the horizontal BDE component 126 may search up to a programmable range specified by a variable searchX (e.g., user-defined range) for up to two potential locations of bands. The inputs into this non-recursive algorithm may include:
  t1, t2: threshold values where t1<t2
  inputPixel: line of input pixels
  curPos (xPos): position of current pixel within line of pixels.
  avg: current average
  cnt: current count of pixels in average.
  searchX: search range to determine whether bands are present.
The outputs of this algorithm may include:
  numBands: number of bands detected
  avg: current average
  cnt: current count of pixels in average.
  nbrPixel: reference pixel from which differences are taken.
  nbrBand: array of band information
With the foregoing in mind, the method 210 may be performed as follows:

```
nbrPixel = inputPixel[curPos];
numBands = 0;
avg     = 0;
cnt     = 0;
for (r in range of search [1,searchX] for right/bottom and
    [-searchX, -1] for left/top)
{
    nbrPos = max(0, min((curPos+r), (width-1)));
    if (abs(nbrPixel - inputPixel[nbrPos]) > t2)
    {
        nbrBand[numBands].val   = (avg + (cnt >> 1)) / cnt;
        nbrBand[numBands++].dist = abs(r)-1;
        break; // Jump out of loop if it is not a smooth region
    }
    else if (abs(nbrPixel - inputPixel[nbrPos]) > t1)
    {
        nbrBand[numBands].val   = (avg + (cnt >> 1)) / cnt;
        nbrBand[numBands++].dist = abs(r);
        nbrPixel              = inputPixel[nbrPos];
        avg                   = inputPixel[nbrPos];
        cnt                   =1;
        if (numBands == 2) break;
    }
    else
    {
      if (curPos + r) is outside of the image boundary
      {
        nbrBand[numBands].dist = abs( r) -1;
        nbrBand[numBands++].val = (avg + (cnt >> 1)) / cnt;
        break;
      }
        avg += inputPixel[nbrPos];
        cnt++;
    }
}
```

Generally, the non-recursive algorithm described above involves identifying pixels that are between two threshold values. Upon identifying these pixels, the algorithm maintains a count of the number of pixels (block 148) that are within this range and an average pixel value (block 146) for each of the pixels within this range.

In certain embodiments, if the above loop is not exited before the search range has been reached, then the horizontal BDE component 126 may determine that a band may correspond to the remainder of the pixels up to the search range. A pseudo-code description of the above is as follows:
  if (r>searchX)
  {
  nbrBand[numBands].val=(avg+(cnt>>1))/cnt;
  if ((xPos+searchX+1)>(width−1))
  nbrBand[numBands++].dist=width−1−xPos;
  else
  nbrBand[numBands++].dist=searchX+1;
  }

Note in the above that the division operator is defined as an integer divide where the fractional bits are truncated.

Referring back to FIG. 12, at block 146, the horizontal BDE component 126 may determine an average pixel value for the pixels that are part of the detected band. In one embodiment, the horizontal BDE component 126 may update an average pixel value for each pixel determined to be part of a band, as determined in the method 210. As mentioned above, the detected band may correspond to pixels that have values that exceed the first threshold T1 but does not exceed the second threshold T2. As such, the horizontal BDE component 126 may update an average pixel value for pixels in the detected band as each pixel determined to be part of the band is identified.

At block 148, the horizontal BDE component 126 may determine the length and location of the leftmost pixel that may be part of the identified band. Referring again to the example depicted in FIG. 13, the horizontal BDE component 126 may determine that the leftmost pixel that is part of the identified band corresponds to the pixel located 10 pixels away from the current pixel 192.

In addition to determining the location of a left band, the horizontal BDE component 126 may also determine the location of a right band by performing the blocks 164, 166, and 168, which functionally operate in the same manner as blocks 144, 146, and 148, respectively. As such, after performing blocks 148 and 168, the horizontal BDE component 126 may identify a left band and a right band along a row of pixels in the image data.

After determining the length and location of the left and right bands, the horizontal BDE component 126 may update statistics related to the identified band at block 150. In one embodiment, the statistics may be updated by the banding statistics component 122 of FIG. 11. The statistics may include a histogram, raw numbers, or the like. For example, the statistics may include a histogram of the left and/or right and top and/or bottom distances between the current pixel and the pixels that are part of the band. These statistics may then be used when interpolating pixel values for the pixels that are identified as being part of the band. By way of example the following stats may updated for when performing a band search in the horizontal direction:

leftDistHist[leftDist]++;
rightDistHist[rightDist]++;

where leftDist and rightDist corresponds to the distance to the left most pixel part of the band and the distance to the right most pixel part of the band, respectively. At the start of each frame leftDistHist and rightDistHist may be initialized to 0 for all histogram bins.

In the same manner, for the vertical search, the following statistics may be updated:
topDistHist[topDist]++;
botDistHist[botDist]++;

where topDist and botDist correspond to the distance to the topmost pixel part of the band in the vertical direction and the distance to the bottom most pixel part of the band in the vertical distance, respectively. Again, at the start of each frame, topDistHist and botDistHist may be initialized to 0 for all histogram bins.

After the statistics are updated at block 150, the horizontal BDE component 126 may proceed to block 152 and determine whether the current pixel should be interpolated. In one embodiment, the horizontal BDE component 126 may interpolate a pixels value for the current pixel when at least two pixels along the same row or column of the current pixel are identified as being part of a band. As such, if the identified band includes just one pixel, the horizontal BDE component 126 may proceed to block 154 and set the output pixel value for the pixel identified as being part of the band equal to the input pixel value received at block 142. Additionally, the horizontal BDE component 126 may interpolate a pixel value for the current pixel when a maximum distance between two pixels that are part of the same band is greater than one. If the horizontal BDE component 126 determines that the pixel interpolation should be performed, the horizontal BDE component 126 may proceed to block 156.

Keeping this in mind, the process shown below illustrates one embodiment in which the horizontal BDE component 126 may determine whether pixel interpolation should be performed. In the process described below, the value of numLeftBands and numRightBands corresponds to the number of left bands and the number of right bands, respectively.

```
if (numLeftBands == 1) leftDist = leftBandInfo[0].dist
else            leftDist = leftBandInfo[0].dist +
                        (leftBandInfo[1].dist - leftBandInfo[0].dist)/2;
if (numRightBands == 1) rightDist = rightBandInfo[0].dist;
else            rightDist = rightBandInfo[0].dist +
                        (rightBandInfo[1].dist - rightBandInfo[0].dist)/2;
maxDist = max(leftDist, rightDist);
minDist = min(leftDist, rightDist);
if ((minDist > 0) && (maxDist > 1))
        Set output pixel to interpolated value with above input values.
else
        Set output pixel to input pixel.
```

With the foregoing in mind, the horizontal BDE component 126 may generally perform pixel interpolation when a pixel is identified as being part of a band that is located at least one pixel away from the current pixel and when there are at least two pixels that are part of the band. After the horizontal BDE component 126 determines that pixel interpolation should be performed, at block 156, the horizontal BDE component 126 may interpolate a pixel value for the current pixel by applying a bit depth expansion algorithm to determine the least most significant bits that may have been part of the original image data for the current pixel. In one embodiment, the horizontal BDE component 126 may interpolate the pixel value based on an average pixel value determined for the pixels identified as being part of the band (block 148) and a distance between the current pixel and the pixel in the band (i.e., in any direction) that is closest to the current pixel. For example, the horizontal BDE component 126 may interpolate the pixel values according to the algorithm shown below. For the following algorithm, inputs may be defined as:

leftBand: structure containing averages for 2 bands
rightBand: structure containing averages for 2 bands
leftDist: left interpolation distance
rightDist: right interpolation distance
numLeftBands: number of left bands
numRightBands: number of right bands The outputs of the algorithm may include:
outPixel: output interpolated pixel The algorithm described in this section performs a filtering of the average values that are contained in the left and right band(s). To do so, the minimum distance between leftDist and rightDist is first calculated:
minDist=min(leftDist, rightDist)

Given minDist, a left and right filtered value is calculated as:
for (tempIdx=0, leftD=0; tempIdx<numLeftBands; tempIdx++)
{
if (leftBand[tempIdx].dist<=minDist)

leftFVal+=(leftBand[tempIdx].val*(leftBand[tempIdx].dist));
else
{
leftFVal+=(leftBand[tempIdx].val*(minDist−leftD));
break;
}
leftD=leftBand[tempIdx].dist;
}
for (tempIdx=0, rightD=0; tempIdx<numRightBands; tempIdx++)
{
if (rightBand[tempIdx].dist<=minDist)
rightFVal+=(rightBand[tempIdx].val*(rightBand[tempIdx].dist));
else
{
rightFVal+=(rightBand[tempIdx].val*(minDist−rightD));
break;
}
rightD=rightBand[tempIdx].dist;
}

From leftFVal and rightFVal that is calculated above, the output pixel is
outPixel=(leftFVal+rightFVal+minDist)/(2*minDist)
After determining the output pixel value, the interpolated value may then be clipped to an unsigned 10-bit value.

As shown above, the horizontal BDE component 126 may interpolate the pixel value based on the respective pixel intensity value for each respective pixel that is part of the left and right bands and a distance between the current pixel and a closest pixel that is part of the left or right band. As such, in one embodiment, the horizontal BDE component 126 may interpolate the pixel value using a bilinear interpolation of the pixels that are part of the band. As a result, the horizontal BDE component 126 may interpolate the missing bits of data for the current pixel.

It should be noted that the interpolation performed by the horizontal BDE component 126 may be construed as a spatially adaptive filter, where the filter length may be determined by an initial band search. However, although the presently disclosed techniques are described such that the employed filter taps are the same (i.e., an average), in certain cases, it may be beneficial to set the filter taps to something other than that where all the taps are constant.

After performing the above process for each pixel in the image data, the interpolated pixel values may attenuate the banding effects depicted on the display 28. That is, the transition of pixel intensities within a previously existing band may be presented on the display 28 as more evenly distributed, as opposed to having abrupt changes in intensity as commonly seen in a band.

Figure 15:
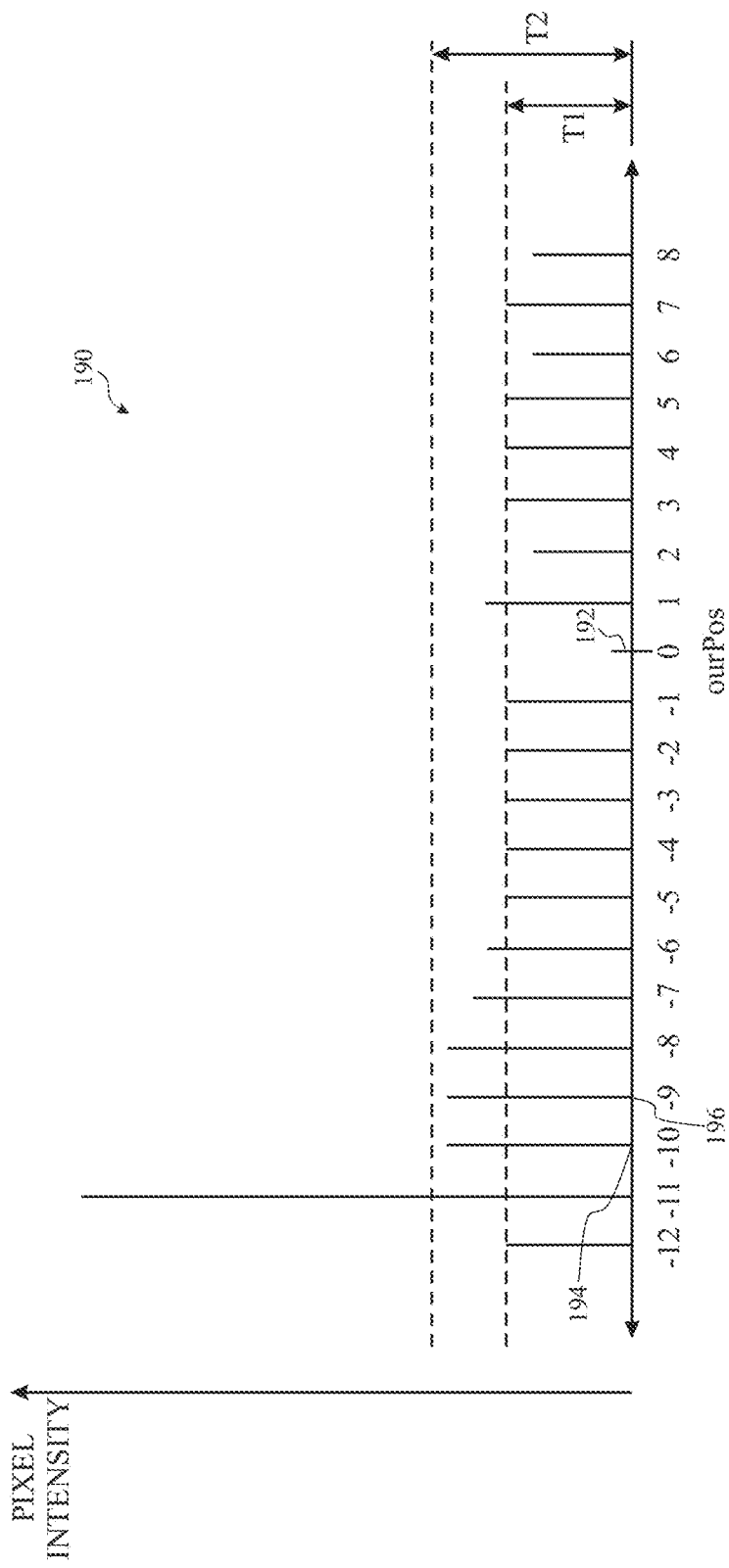
FIG. 15 is a graph of interpolated pixel intensities for a number of pixels that may be part of the display in the electronic device of FIG. 1, in accordance with an embodiment.

Keeping the foregoing in mind and referring again to the example depicted in FIG. 13, the horizontal BDE component 126 may interpolate a pixel value for the pixel 194 (located at −10 or when pixel at position −10 is the current pixel) based on the average of the pixel values of the pixels to the right of the pixel 194 that are part of a detected band and a minimum distance between the pixel 194 and the pixels that are identified as part of the band. In this example, the minimum distance is 1 because the pixel 196 located at −9 is the closest pixel to the pixel 194 that is part of the detected band. When performing the method 140 for each of the pixels illustrated in FIG. 13, the interpolated pixel intensity values in the band may be distributed as shown in FIG. 15 to more accurately illustrate the transition of pixel intensities.

The above description for identifying pixels in a band and interpolating a pixel value for the current pixel may generally be used to identify bands in the horizontal and vertical directions with respect to the input pixel. However, to perform the method 140 described above in the vertical directions, the vertical BDE component 124 may use a buffer to maintain an entire frame of image data while performing the method 140. As such, in certain embodiments, to reduce the amount of memory or buffer space used to identify pixels within a band, the vertical BDE component 124 may employ a recursive algorithm to identify pixels in a band and to interpolate a pixel value for the current pixel based on the pixels in the identified band(s). The recursive algorithm may involve storing a location of a band or a location where a pixel value exceeds either threshold (T1 or T2) in a memory (e.g., buffer). In addition to storing the location of a band, the buffer may include one line of image data that includes cumulative or accumulated data regarding previous lines of image data. Additional details regarding the recursive algorithm for identifying pixels in a band and interpolating a pixel value for the current pixel will be discussed below.

Referring back to block 144 of the method 140, to perform a recursive algorithm for detecting locations of bands when performing a vertical pass, the vertical BDE component 124 may store a previous row of pixel information in a buffer. The pixel information consists of the following data for each pixel in the previous row of pixels:

```
struct PreviousInfo
{
    PixelInfo    pixInfo;
    BandInfo     bandInfo[2];
    u22     curAvg;
    u12     curCnt;
}
Where:
struct PixelInfo
{
    u2 numBands;              // Number of bands detected so far
    s7 accumulated_delta;     // Accumulated difference between current and previous pixel.
}
struct BandInfo
{
    u8 distance;              // Distance from either current pixel or previous band to
                              // current band location
    u10 average;              // Average value over the band
}
```

In one embodiment, the structure PreviousInfo may consist of 14-bits and may specify the original pixel value in addition to an accumulated difference in intensity of a respective pixel. The accumulated difference may initially correspond to a difference or delta between a current pixel and a respective pixel immediately preceding (e.g., in horizontal or vertical direction) the current pixel. As each subsequent line of data is read or output, the accumulated difference for each pixel in the line may be updated. When the accumulated difference exceeds a first threshold T1 and is lower than a second threshold T2, the vertical BDE component 124 may identify the current pixel as part of a band. In one embodiment, the accumulated difference may be reset to 0 every time a band is identified, such that the accumulated difference will then be compared to the first threshold T1 and the second threshold T2 with respect to the new band.

The structure BandInfo may include an array of 2 that stores information regarding bands that have been identified thus far. A current average and count are also maintained to keep track of the current average pixel value and number of pixels used to form the average pixel value. With this in mind, there may be a minimum of previousSize=9+2*18+34=79 bits that the vertical BDE component 124 may store per pixel. In certain embodiments, at the start of reading each line in the image data, the PreviousInfo structure may be initialized to zero. Additionally, SearchBot (e.g., default=64) lines of future original input pixel values (e.g., 10-bit) may be made available in line buffers along with one additional line of previous input pixel values (10-bit). The previous line of information may have a size of width*sizeof (PreviousInfo), where width may be 4096 bits. As such, the new line may be read in and processed per-pixel, such that the output may be used by the next line.

With this in mind, the vertical BDE component 124 may identify locations of bands based on a current pixel value of the current pixel 192, an immediately previous pixel with respect to the current pixel 192, and a value of the accumulated delta, which corresponds to an accumulated difference between the current pixel and the previous pixel. It should be noted that given the manner in which the information regarding each pixel is stored and received by the debanding component 90, the following recursive algorithm for detecting a band may be used to identify bands located to the left or above of the current pixel.

In certain embodiments, the inputs to the recursive algorithm for identifying bands include:
  accumulatedDelta: current accumulatedDelta of difference pixel for current pixel.
  inputPixel: line of input pixels
  curPos: position of current pixel in video line.
  numLeftBands: current number of bands detected.
  leftBand: array of band information that may be described by the structure
  leftAvg: current average
  leftCnt: current count of pixels used in average.
The outputs of this algorithm are:
  accumulatedDelta: current accumulatedDelta of difference pixel for current pixel.
  leftAvg: current average.
  leftCnt: current count of pixels used in average
  numLeftBands: number of bands detected.
  leftBand: array of band information that may be described by the structure
Note that accumulatedDelta, numLeftBands and leftBand are both an input and an output to this algorithm as it is persistent across the video line.

```
//Calculate left/top band information
if (abs(accumulatedDelta)>t2)
{
Set leftBand[1] to 0;
leftBand[0].val=inputPixel[curPos];
leftBand[0].dist=0;
leftAvg=inputPixel[curPos];
leftCnt=1;
numBands=1;
accumulatedDelta=0;
}
else if (abs(accumulatedDelta)>t1)
{
Copy leftBand[0] to leftBand[1]
leftBand[0].val=inputPixel[curPos];
leftBand[0].dist=1;
leftAvg=inputPixel[curPos];
leftCnt=1;
numBands++;
Clip numBands to [0,2];
accumulatedDelta=0;
}
else
{
leftBand[0].dist++;
leftCnt++;
leftAvg+=inputPixel[curPos];
leftBand[0].val=(leftAvg+(leftCnt>>1))/leftCnt;
}
if ((leftBand[0].dist>xPos)||(leftBand[0].dist>searchX))
{
set leftBand[1] to 0;
numBands=1;
if ((xPos-(searchX+1))<0)
leftBand[0].dist=xPos;
else
leftBand[0].dist=searchX;
}
else if (((leftBand[0].dist+leftBand[1].dist)>xPos)||((leftBand[0].dist+leftBand[1].dist)>searchX))
{
numBands=2;
leftBand[1].dist=searchX-leftBand[0].dist;
}
if (numBands>1) leftBand[1].dist+=leftBand[0].dist;
//Distance for second band should be total distance from current pixel.
```

It should be noted that in the algorithm described above the division operation is defined as an integer divide where the fractional bits are truncated.

As mentioned above, the recursive algorithm described herein may be used to identify bands located to the left of on top of the current pixel, while maintaining a relatively low amount of memory. As such, in certain embodiments, a half-recursive algorithm may be used to identify bands in the image data. For example, the non-recursive algorithm described above with reference to block 144 may be used to identify bands located to the right or below a current pixel, while the recursive algorithm described above may be used to identify bands located to the left or above the current pixel when data is read out from left to right.

To perform this vertical half-recursive algorithm, the vertical BDE component 124 may first perform the non-recursive algorithm described above with reference to block 144 to identify bands that may be located on the same column of and underneath the current pixel. As such, the vertical BDE component 124 may first pass the following inputs into the non-recursive algorithm:

t1, t2: programmable thresholds such that t1<t2
inputPixel: current line of input pixels
width: width of the incoming video line
curPos: position within incoming video line of the current
searchBot: search range across future pixels to search for bands, The outputs of the non-recursive algorithm for identifying bands may then include"
numBotBands: number of bands on the bottom—between 0 and 2
botAvg: current average for bottom
botCnt: pixel count corresponding to botAvg
botBandInfo: band information corresponding to bottom bands.

The inputs into the recursive algorithm may then include the following:
prevInfo[curPos].accumulatedDelta: accumulated delta with structure PreviousInfo from the previous line.
inputPixel: current line of input pixels
curPos: width of the incoming video line
prevInfo[curPos].numBands: number of top bands detected.
   Initialized to 0 at start of video line.
topBandInfo: band information corresponding to top band.
   Initialized to 0 at start of video line.

The outputs of the recursive algorithm may then include the following:
prevInfo[curPos].accumulatedDelta: accumulated delta with structure
   PreviousInfo from the previous line.
topAvg: current average.
topCnt: current count of pixels used in average
prevInfo[curPos].numBands: number of top bands detected.
topBandInfo: band information corresponding to top band.
   Initialized to 0 at start of video line.

After the bottom and top band information is calculated, the vertical BDE component 124 may check a set of conditions, such as those described in block 152, to determine whether interpolation of the bands should be performed. As shown in the pseudo code related to the recursive algorithm for identifying bands described above, the value of numTopBands and numBotBands will be equal to either 1 or 2. As mentioned above, it is possible that interpolation is not performed and the output pixel is set equal to the input pixel. Additionally, the distance for the top and bottom bands is limited to be the value of the search range plus one. With this in mind, the logic below describes whether interpolation is performed.

if (numTopBands==1) leftDist=topBandInfo[0].dist
   else leftDist=topBandInfo[0].dist+(topBandInfo[1].dist−topBandInfo[0].dist)/2;
   if (numBotBands==1) rightDist=botBandInfo[0].dist;
   else rightDist=botBandInfo[0].dist+(botBandInfo[1].dist−botBandInfo[0].diat)/2;
   maxDist=max(leftDist, rightDist);
   minDist=min(leftDist, rightDist);
   if ((minDist>0) && (maxDist>1))
   Set output pixel to interpolated value obtained by using the process described in block 156 with above input values.
   else
   Set output pixel to input pixel.
   If interpolation is to be performed, then the vertical BDE component 124 may set the output pixel to the resulting interpolated pixel. Otherwise the output pixel is set equal to the input pixel. In one embodiment, the vertical BDE component 124 may perform pixel interpolation by using the algorithm described above with respect to block 156 with input variables leftValue, rightValue, leftDist and rightDist. The values of the input variables may be determine based upon the number of bands detected from the non-recursive band search algorithm and the recursive band search algorithm.

With the foregoing in mind, it should be noted that in other embodiments, to improve the picture quality of horizontal de-banding, with the cost of extra logic and gates, the horizontal band-detecting techniques described herein may be implemented on the original pixel data. As such, the horizontal band-detection may occur before vertical pixel processing.

Tri-Lateral Filter

Referring back to FIG. 11, in certain embodiments, after performing the bit depth expansion processes using the vertical BDE component 124 and the horizontal BDE component 126, the resulting image data may be processed by the vertical tri-lateral filter (TLF) component 128 and the horizontal TLF component 130. As such, the pixel processing may be performed using separable filters, with a vertical filter followed by a horizontal filter.

In one embodiment, the banding statistics component 122 may collect information regarding the band/quantization step sized at different block offsets. This information may be received via a video decoder/encoder or generated by an individual statistics block that may or may not be located within the debanding component 90 as described above. That is, the banding statistics component 122 may receive statistics that may be passed in as auxiliary data from a video decoder that contains information regarding the original bit depth and/or the quantization values and block sizes where the quantization and transform of the image data are performed. This information may help tune the TLF component 130 to operate more effectively. If auxiliary statistics are not available from a video decoder, a statistics generating component, which may be part of the debanding component 90 or separate from the debanding component 90, may estimate quantization noise variance, which may then be used to tune the BDE component 124 and the TLF component 130.

This information or statistics may be used by the vertical TLF component 128 and the horizontal TLF component 130 to apply a pixel adaptive low pass filter to each pixel in the image data to further reduce bands and blocking artifacts caused by video compression. Generally, the vertical TLF component 128 and the horizontal TLF component 130 may attenuate pixel data based on pixel intensity using a bi-lateral filter and may attenuate the pixel data using a third component that considers spatial activity. As such, the vertical TLF component 128 and the horizontal TLF component 130 may provide a low pass filter for an input signal that removes blockiness and banding caused by encoder quantization beyond the least significant bits corrected by bit depth expansion process described above. In certain embodiments, to reduce chip area, the vertical bit-depth expansion techniques described above may be combined with the vertical trilateral filter techniques described below.

Figure 16:
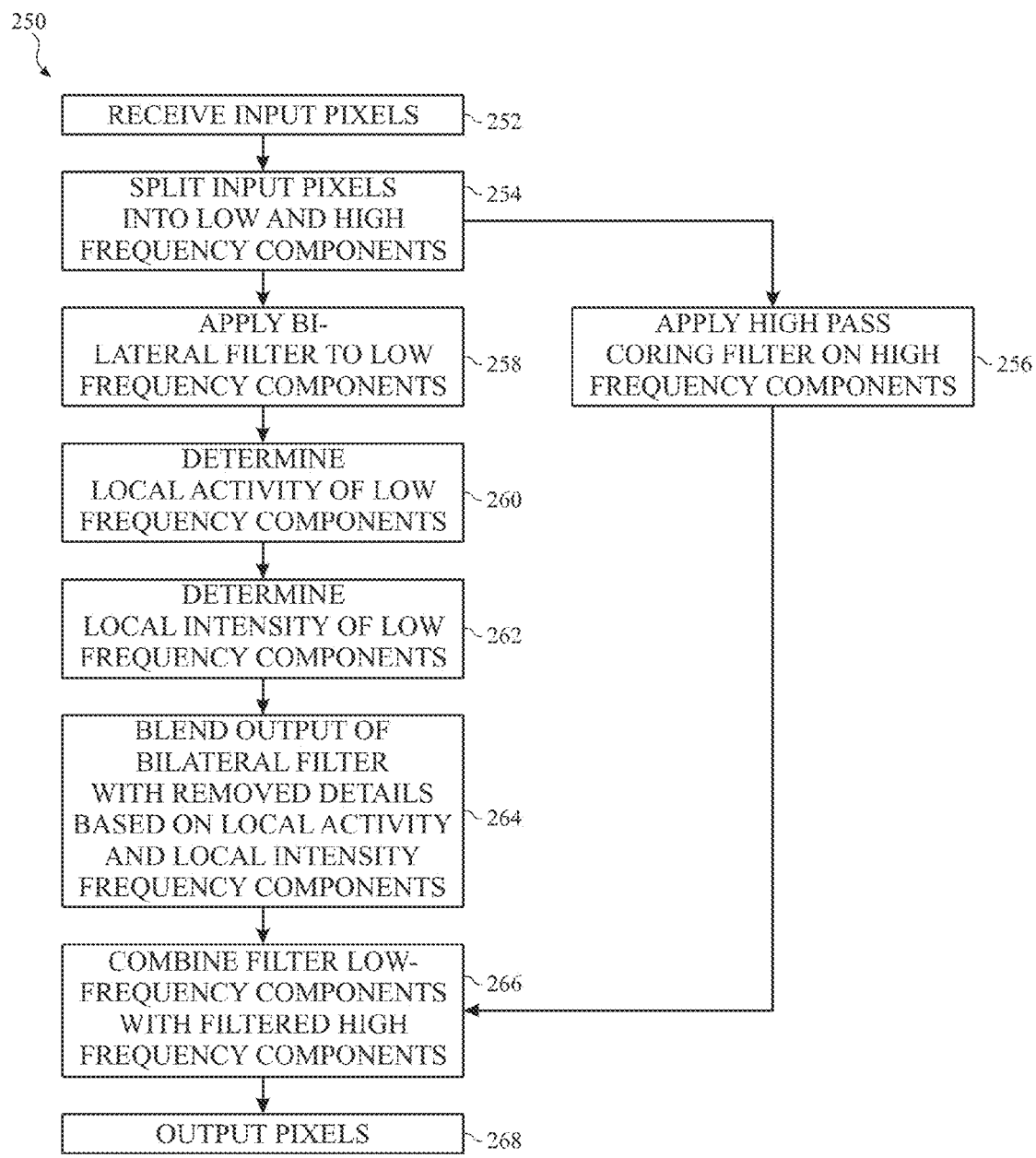
FIG. 16 is a flow chart of a method for attenuating visual artifacts from image data using a tri-lateral filter, in accordance with an embodiment.

Keeping the foregoing in mind, FIG. 16 illustrates a method 250 for removing visual artifacts, such as banding, from input image data using a tri-lateral filter. For the purposes of discussion, the following description of the method 250 will be described as being performed by the horizontal TLF component 130. However, it should be noted that the method 250 may also be performed by the vertical TLF component 128 in a similar manner.

Referring now to FIG. 16, at block 252, the horizontal TLF component 130 may receive image data or a stream of input pixels that have been processed by the vertical BDE component 124 and/or the horizontal BDE component 126. It should be noted that in certain embodiments, the horizontal TLF component 130 may also receive the stream of input pixels before the input pixels are processed by the vertical BDE component 124 and/or the horizontal BDE component 126.

After receiving the stream of input pixels, the horizontal TLF component 130 may split or separate the input pixels into a low frequency components and high frequency components using a reversible wavelet filter. That is, the wavelet filter used by the horizontal TLF component 130 may split input pixels into low and high frequency components and may also be able to recombine the low and high frequency components back into a stream of pixels. In one embodiment, the horizontal TLF component 130 may employ a 5/3 lifted wavelet filter, which is reversible. As mentioned above, the 5/3 lifted wavelet filter may split the stream of input pixels into low and high frequency components. The 5/3 lifted wavelet is a reversible filter (i.e., reconstruction of the stream of input pixels can be achieved) that outputs low and high frequency components at half a rate at which the input pixels are received. As such, filtering the low pass output may involve just half a number of filter taps for a spatial filter as normally would be used.

In one embodiment, the forward version (i.e., splitting the stream of pixels into low and high frequency components) of the 5/3 wavelet filter may be defined as:
When High Pass filter taps are [−½, 1, −½], the 5/3 wavelet filter is implemented with rounding as:

Out[2x+1]=In[2x+1]−((In[2x]+In[2x+2]+1)>>1)

When Low Pass filter taps are [−⅛, ¾, ¼−⅛], the 5/3 wavelet filter is implemented with rounding as:

Out[2x]=(6*In[2x]+2*(In[2x−1]+In[2x+1])−((In[2x−2]+In[2x+2+4])>3)

The low pass filter can then be 'lifted' from the high pass filter (i.e., the output of the low pass filter can be used as the input to the high pass filter to save computations) as follows:

Out[2*x]=In[2*x]+((Out[2*x−1]+Out[2*x+1]+1)>>1), which yields the same result. When using the lifted version of the filter, the low pass output is therefore on odd pixels, and the high pass output on even pixels:

Out$_{lp}$[x]=Out[2x]

Out$_{hp}$[x]=Out[2x+1]

Since the stream of input pixels include low and high frequency components that are interleaved with each other, half of the input pixels may contain low frequency components and the other half may contain high frequency components. As such, when Out$_{lp}$ [x] and Out$_{hp}$ [x] are half the size of the input, the low frequency components may be filtered with a bi-lateral filter at block 258 and the high frequency components may be filtered with a coring filter at block 256.

As mentioned above, after the stream of input pixels are split into low and high frequency components, the horizontal TLF component 130 may proceed to block 256 to apply a coring filter on the high frequency components and may proceed to block 258 to apply a bi-lateral filter to the low frequency components. The coring filter or high frequency coring may remove noise and changes (deltas) that are lower than some threshold that may be left in the high frequency band of the high frequency components after the low frequency components were separated from the input pixels at block 254. An example of the coring process is illustrated in FIG. 17.

Figure 17:
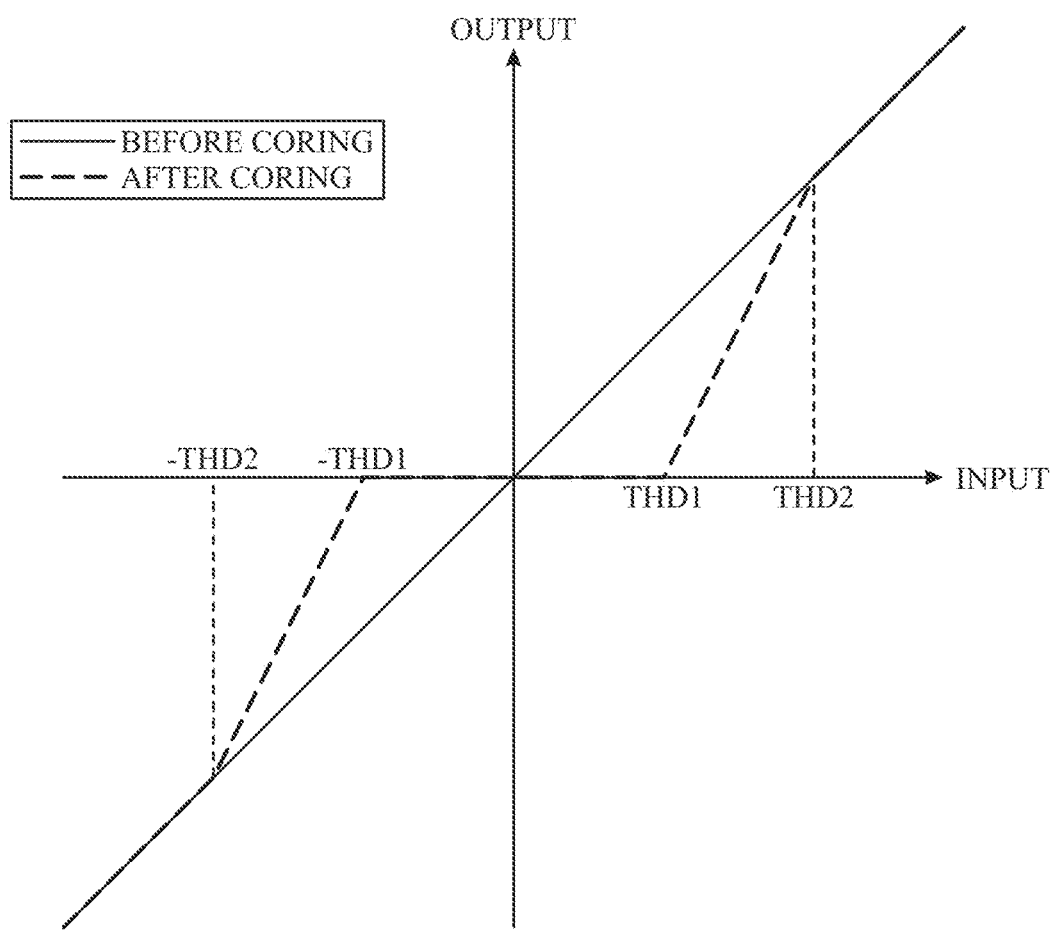
FIG. 17 is a graph illustrating the effects of coring, in accordance with an embodiment.

As shown in FIG. 17, data within a first range (e.g., thd1 and −thd1) may be removed and data within a second range (e.g., thd2 and −thd2) may be interpolated to ensure that low frequency noise is removed from the high frequency components. In one embodiment, the coring filter may be defined as:

if(abs(Out$_{hp}$[x])<coreThd1)

Out'$_{hp}$[x]=0 else if(abs(Out$_{hp}$[x])>coreThd2)

Out'$_{hp}$[x]=Out$_{hp}$[x]

else $$p = \frac{(abs(Out_{hp}[x]) - coreThd1) * coreThd2}{(coreThd2 - coreThd1)}$$

Out'$_{hp}$[x]=Out$_{hp}$[x]>0?p:−p where Out$_{hp}$[x] corresponds to a value of a high frequency component of an input pixel, Out corresponds to a new value of the high frequency component of the input pixel, coreThd1 corresponds to a low coring filter threshold, coreThd2 corresponds to a high coring filter threshold, and p corresponds to an interpolated value of the high frequency component of the input pixel. Although the above description of the coring filter is described as being performed on the high-pass band of a wavelet decomposition, it should be understood that this is one example of how the method 250 may be performed. It should be noted that it is also possible to use statistics from the low-pass band to perform coring type functionality and other processing in the high-pass band.

Referring back to block 258, after splitting the stream of input pixels into low and high frequency components, the horizontal TLF component 130 may apply a bi-lateral filter to the low frequency components. The bi-lateral filter is a non-linear, edge-preserving and noise-reducing smoothing filter for image data. Generally, the intensity value at each input pixel in the image data is replaced by a weighted average of intensity values from nearby pixels. This weight can be based on a Gaussian distribution, on Euclidean distance of pixels, on radiometric differences (e.g. range differences, such as color intensity, depth distance, etc.), or the like. With this in mind, FIG. 18 illustrates additional details with regard to applying the bi-lateral filter in a data flow chart 280 that corresponds to the method 250.

Figure 18:
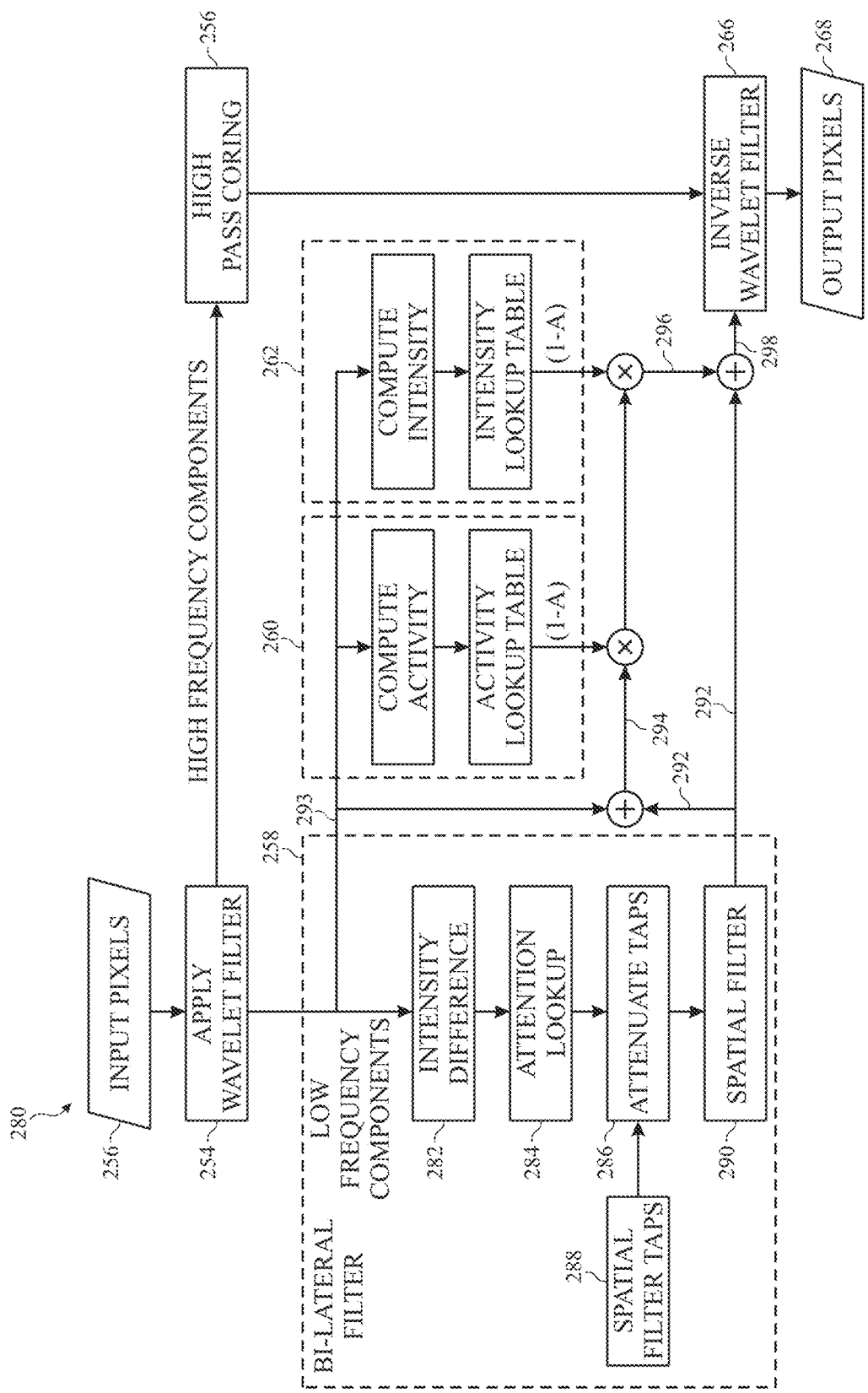
FIG. 18 is a data flow chart of a process that corresponds to the method for attenuating visual artifacts from image data of FIG. 16, in accordance with an embodiment.

As shown in FIG. 18, the bi-lateral filter may determine intensity differences between the low frequency components of the input pixels at block 282. The intensity difference between the low frequency components may then be used to determine attenuation factors or spatial filter coefficients used for spatial filter taps of the bi-lateral filter. Generally, the initial attenuation factor is 1.0 (represented as a 1.10 number). Intensity difference thresholds and a slope between attenuation factors and differences in intensities (deltas) are then used to determine the attenuation factor. For instance, FIG. 19 illustrates an example of how the attenuation factor may be characterized with respect to a delta or an amount of change in pixel intensities.

Figure 19:
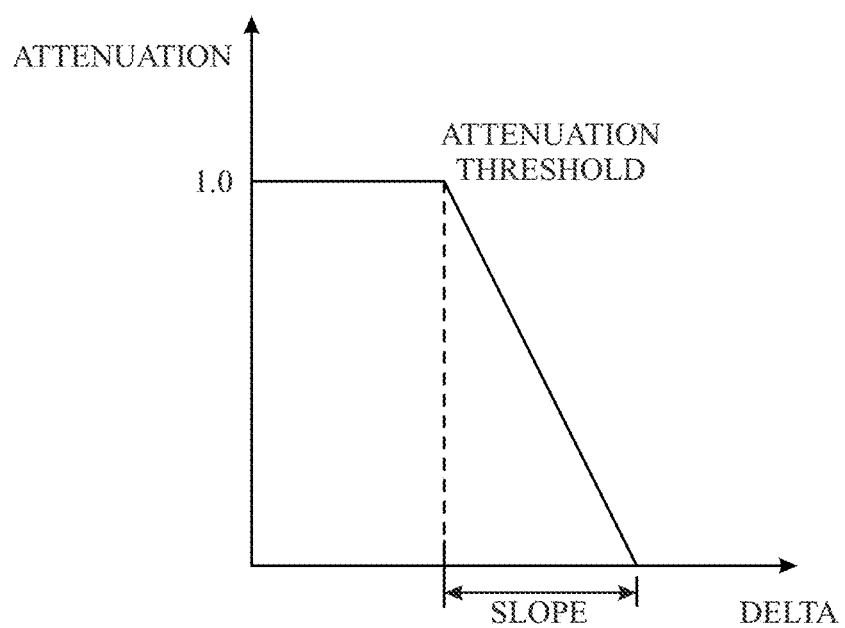
FIG. 19 is a example graph of an attenuation factor determined based on intensity differences between pixels, in accordance with an embodiment.

Referring to FIG. 19, if the intensity difference or delta is less than an attenuation threshold, the attenuation coefficient is 1.0 (i.e., no attenuation). After the intensity difference exceeds the threshold, the attenuation factor decreases linearly as defined by the slope. The slope may be defined as a power of two, such that the attenuation coefficient can be implemented with a shift operation. In one embodiment, the attenuation coefficient is an 11-bit integer with 10 fractional bits (e.g., a 1.10 number).

Figure 20:
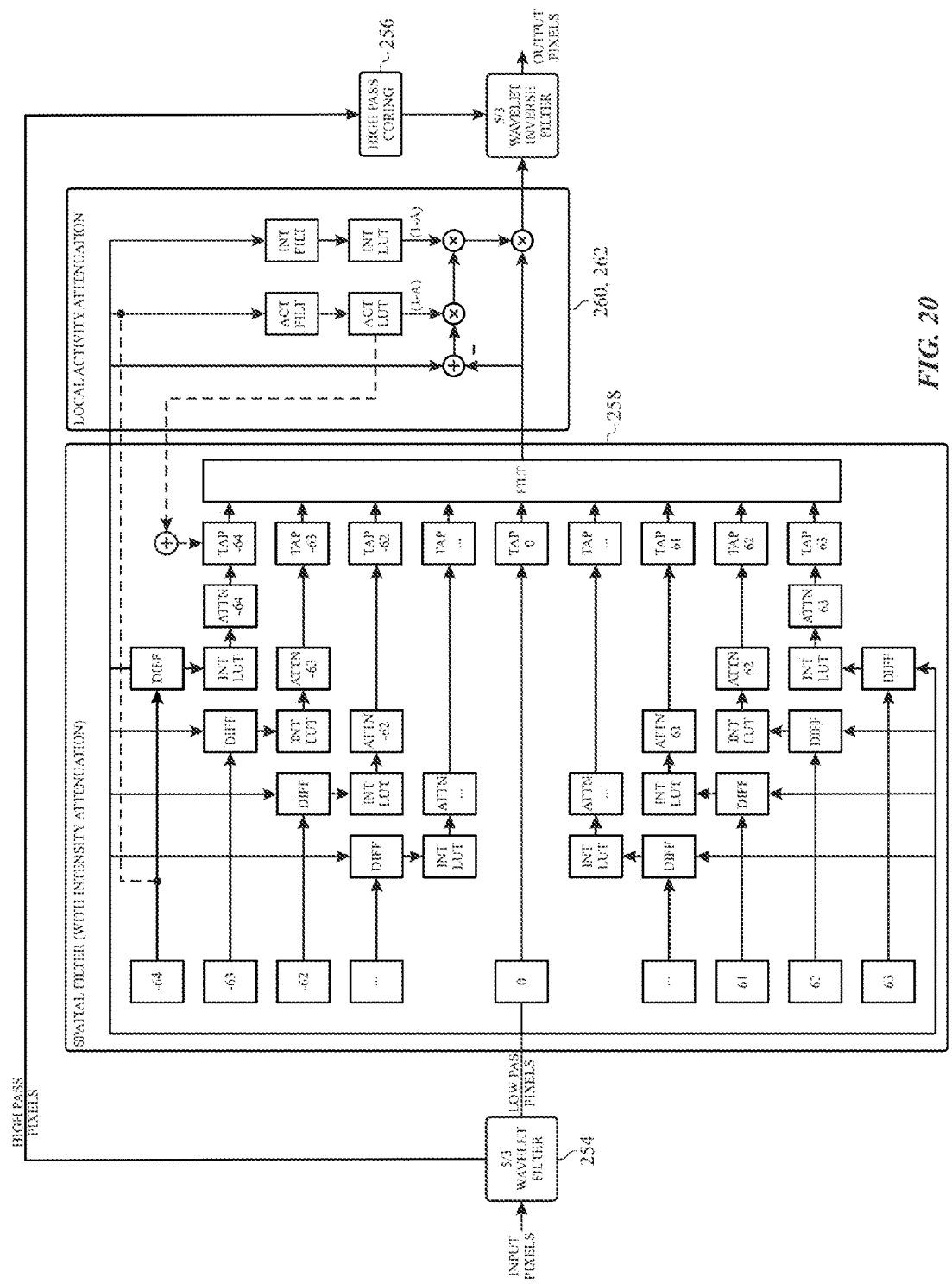
FIG. 20 is a schematic block diagram of the flowchart of FIG. 16, in accordance with an embodiment.

Referring back to block 282 of FIG. 18, the intensity difference or delta between low frequency components may be computed as an absolute value of the pixel difference between a center tap of the bi-lateral filter and a tap to be attenuated. FIG. 20, for instance, provides an example of how the pixel intensity difference between the low frequency components of the input pixel stream and a value at a tap within the bi-lateral filter may be determined. After determining the pixel intensity difference, at block 284, the horizontal TLF component 130 may determine an attenuation factor or coefficient based on the intensity difference or delta as discussed above. In one embodiment, the attenuation coefficient derivation procedure may be performed according to the pseudo-code below:

```
tap; //current location of the filter tap to be attenuated
x; //current pixel position
p[x]; //pixel at position x
delta=0; //delta value used for lookup
AttnThd; //attenuation threshold
AttnCoeff; //attenuation coefficient
Log2Slope //Log2 of the Slope
delta=abs(p[x]-p[tap]);
delta=min(1023, delta); //clip to 1023
if (delta<AttnThd)
   intAttn[tap]=1024;
else
   intAttn[tap]=1024-((1024*(delta-AttnThd))
      >>Log2Slope)
//clip negative to zero
if (intAttn[tap]<0) intAttn[tap]=0;
```

The intAttn factor or intensity attenuation factor calculated at each tap is then used to attenuate each tap of the spatial filter.

At block 286, the horizontal TLF component 130 may apply the attenuation factors determined at block 284 to spatial filter taps 288. That is, after all taps are attenuated, the sum of pixel coefficients is computed and used to normalize the filter coefficients to sum to 1.0. In one embodiment, the spatial filter tap computation is summarized in the pseudo-code below:

```
spatFilt[129];   // spatial filter, initial coefficients are programmable
tapSum = 0;      // sum of filter taps used for normalization
pixOut = 0;      // filter pixel output
sRange;          // search range
   for (k=-sRange; k<+ sRange; k++) {
      spatFilter[k+sRange] *= intAttn[k+sRange];
      tapSum += spatFilter[k+sRange];
      pixOut += spatFilter[k+sRange] * p[x+k+sRange]
   }
   // normalize output
   if (tapSum == 0) // avoid divide by zero
      pixOut = p[x]
   else
      pixOut = (pixOut + tapSum/2) / tapSum
```

As shown in FIG. 18, the horizontal TLF component 130 may then apply a spatial filter 290 to the low frequency components of the stream of input pixels. The output of the spatial filter 290 or the filtered low frequency component signal 292 may then be subtracted from original low frequency components 293 output by the wavelet filter. As such, signal 294 may correspond to details in the image data that have been removed from the original low frequency component signal 293 by the bi-lateral filter. The amount in which these details are added back to the filtered low frequency component signal 292 may then be determined based on the local activity and the local intensity of the original low frequency component signal 293, as will be discussed below.

Referring back to FIG. 16, after applying the bi-lateral filter to the low frequency components, the horizontal TLF component 130 may, at block 260, determine the local activity of the original low frequency component signal 293 identified at block 254. The local activity of the original low frequency component signal 293 may be used to identify areas within the image data that may depict a flat pattern, which may correspond to areas in the image data where banding may occur. By determining the local activity of the original low frequency component signal 293, the horizontal TLF component 130 may determine how much of the output of the bi-lateral filter may be used or how much of the details of the original low frequency component signal 293 may be added back into the bi-laterally filtered low frequency components. In certain embodiments, the amount of bi-laterally filtered low frequency components used may be reduced for pixels that are in highly textured areas to avoid blurring.

To determine the local activity of the low frequency component signal 293, the horizontal TLF component 130 may determine sums the pixel differences of eight pixels surrounding the current pixel as follows:

$$P_{act} = \sum_{n=-4}^{7} \text{abs}(p(n) - p(n+1))$$

The horizontal TLF component 130 may then use the sum of the differences to determine an attenuation factor that corresponds to a fraction of the differences between the input and filtered pixels that may be added back to the filtered pixel. In one embodiment, the horizontal TLF component 130 may collect or generate a histogram of pixel activity values and use the histogram to generate an activity lookup table (actLUT) that may provide a number of attenuation factors indexed according to pixel activity values. In one embodiment, the histogram of pixel activity values may be collected during a first pass of the method 250 (e.g., vertical pass). Generally, the activity attenuation computation may be performed according to the pseudo-code below:

```
actLUT[1023]; //activity look up table
pixAct=0; //local pixel activity
//activity is computed as sum of pixel differences in small window
for (k=-4; k<4; k++) {
   pixAct+=abs(p[x+k]-p[x+k+1]);
}
pixAct=min(1023, pixAct); //clip to 1023 actAttn=actLut[pixAct];
```

After determining the local activity of the low frequency components and an attenuation factor based on the local activity, at block 262, the horizontal TLF component 130 may determine a local intensity of the low frequency components. Generally, the pixels that are spatially close in intensity and have low activity correspond to areas of the image data that may experience banding. As such, the horizontal TLF component 130 may use an intensity of the low frequency component of an input pixel to determine an amount or percentage of the filtered output should be used (or an amount of the details removed by the bi-lateral filter to put back into the filtered low frequency components 292). In one embodiment, the amount of filtering based on the intensity of the low frequency components is controlled based on a brightness or color saturation of the low frequency components. As such, this filtering may reduce the amount of filtering used in dark areas or for low saturation colors.

With the foregoing in mind, as shown in FIG. 18, at block 262, the intensities of the low frequency components may be calculated and used to determine intensity attenuation factors to be applied to the signal 294. In one embodiment, the intensity attenuation factor may be determined using a lookup table (intLUT) that may include a number of attenuation factors indexed according to intensity values. An example of the intensity attenuation computation is summarized in the pseudo-code below:

intLUT[1023]; //intensity look up table
intAttn=intLut[p[x]];
//combine activity and intensity attenuations
attn=(actAttn*intAttn+(1024>>1))>>10;
pixOut+=((1024−attn)*(p[x]−pixOut)+(1024>>1))>>10;

pixOut provides the final output of one pass (horizontal or vertical) of the tri-lateral filter.

Upon determining the intensity attenuation factor, the activity attenuation factor is multiplied by the intensity attenuation factor to obtain a final attenuation factor, as shown in FIG. 18. Referring again to FIG. 16, at block 264, the horizontal TLF component 130 may blend the output of the bi-lateral filter (e.g., filtered low frequency components 292) with an attenuated signal 296, which may correspond to an amount of details removed from the original low frequency component signal 293 by the bi-lateral filter. By accounting for the local activity of the original low frequency component signal 293, the blended output may avoid over-filtering pixels that are textured or in high frequency areas of the image data. Moreover, by accounting for the local intensity of the original low frequency component signal 293, the amount or degree of filtering performed by the method 250 may be controlled based on local brightness or color saturation.

Although the horizontal TLF component 130 is described with respect to the method 250 as using the local activity and the local intensity to attenuate the output of the bi-lateral filter, it should be noted that in certain embodiments, the output of the bi-lateral filter may be attenuated using just the local activity or just the local intensity. As such, it should be understood, that the method 250 is not limited to being performed in the manner described herein; instead the method 250 may be performed using just a portion of the blocks depicted in FIG. 16.

After blending the attenuated signal 296 with the filtered low frequency component signal 292, at block 266, the horizontal TLF component 130 may combine a blended output signal 298 with the high frequency components filtered by the coring filter discussed above. As such, the blended output signal 298, which includes the desired low frequency components or low frequency components that have been filtered to attenuate undesired visual artifacts, are recombined with the high frequency components to generate a stream of output pixels. In one embodiment, the horizontal TLF component 130 may recombine the low frequency components with the high frequency components using an inverse wavelet filter that corresponds to the wavelet filter employed at block 254. After recombining the low frequency components with the high frequency components, at block 268, the horizontal TLF component 130 may output the stream of output pixels to additional processing components within image processing circuitry 32, to the display 28, or the like.

Although the method 250 described above indicates that the low frequency components and the high frequency components are separated and processed differently, in certain embodiments the input stream of pixels may not be separated by a wavelet filter. Instead, the method 250 may be performed as discussed above without processing the low frequency components and the high frequency components separately. However, in view of processing and hardware costs associated with performing the method 250 on the original input stream of pixels, it may be beneficial to perform the method 250 as described above.

In certain embodiments, the horizontal TLF component 130 may perform the method 250 on a line-by-line basis. Alternatively, the horizontal TLF component 130 may perform the method 250 according to tile regions of the image data. As such, a buffer may store pixel data for a tile region of the image data. The horizontal TLF component 130 may then perform the method 250 within the tile region. The horizontal TLF component 130 may repeat this process for each tile region of the image data to reduce banding and other visual artifacts from the image data.

As mentioned above, although the method 250 is described with respect to the horizontal TLF component 130, it should be noted that the vertical TLF component 128 may also perform the method 250 in the vertical direction. To perform the method 250 using the vertical TLF component 128, in one embodiment, a portion or a number of lines of the image data may initially be stored in a buffer and the vertical TLF component 128 may perform the method 250 based on the portion of the image data stored in the buffer. After the vertical TLF component 130 outputs pixel values that have been tri-laterally filtered, the horizontal TLF component 130 may then perform the method 250 in the same portion of the image data. After each portion of the image data is filtered by the vertical TLF component 128 and the horizontal TLF component 130, the resulting output pixels may be sent to the display 28.

In certain embodiments, one or more taps used by the bi-lateral filter of the method 250 may also be attenuated based on the local activity of a pixel value associated with the respective tap in the same manner as described above. For example, as shown in FIG. 20, the pixel value at the −64 tap may be input into the activity filter to determine a local activity of the respective pixel value. After the local activity for the respective pixel value is determined, an attenuation factor is determined using an activity lookup table, as described above. The activity attenuation factor may then be provided to the −64 tap as shown. In this manner, the −64 tap of the spatial filter may also attenuate undesired visual effects, such as banding. Although FIG. 20 only depicts how the local activity of a pixel value at the −64 tap is attenuated, it should be noted that the above-described process for attenuating pixel data at a tap may be applied to any combination of the taps of the spatial filter. As such, the above description of the attenuation of the −64 tap is provided for example purposes and is not meant to limit the manner in which other taps may also be attenuated.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An image signal processing system, comprising:
processing circuitry configured to reduce banding artifacts in image data to be depicted on a display, wherein the processing circuitry is configured to:
receive a stream of pixels associated with the image data;
collect statistics regarding the stream of pixels;
separate the stream of pixels into low frequency components and high frequency components;
filter the low frequency components to remove noise, thereby generating a first filtered output;
filter the high frequency components to remove noise, thereby generating a second filtered output;
determine a local activity of the low frequency components;
blend the first filtered output with the low frequency components based on the local activity, thereby generating a third filtered output; and
combine the third filtered output with the second filtered output, thereby generating a fourth filtered output;
send the fourth filtered output to the display.

2. The image signal processing system of claim 1, wherein the processing circuitry is configured to determine the local activity for one pixel in the stream of pixels based on a sum of pixel differences of a number of pixels surrounding the one pixel.

3. The image signal processing system of claim 2, wherein the number of pixels is eight.

4. The image signal processing system of claim 1, wherein the processing circuitry is configured to store the local activity as part of the statistics.

5. The image signal processing system of claim 4, wherein the processing circuitry is configured to generate an activity lookup table based on the statistics, wherein the activity lookup table comprises a plurality of attenuation factors indexed according to a plurality of activity values.

6. The image signal processing system of claim 1, wherein the processing circuitry is configured to blend the first filtered output with the low frequency components by:
determining an attenuation factor based on the local activity; and
applying the attenuation factor to a difference between the first filtered output and the low frequency components, thereby generating a fifth filtered output; and
combining the fifth filtered output with the first filtered output.

7. A method for attenuating banding in image data, comprising:
receiving, via circuitry, a stream of input pixels associated with the image data to be depicted on an electronic display;
applying a bi-lateral filter to a first portion of the stream of input pixels to generate a first filtered output;
applying a coring filter to a second portion of the stream of input pixels to generate a second filtered output;
determining a local activity associated with the first portion of the stream;
determining a local intensity associated with the first portion of the stream;
blending the first filtered output with the first portion of the stream of input pixels based at least in part on the local activity and the local intensity to generate a third filtered output;
combining the third filtered output with the second filtered output to generate a fourth filtered output configured to be depicted as the image data on the electronic display.

8. The method of claim 7, comprising separating the stream of input pixels into low frequency components and high frequency components.

9. The method of claim 8, wherein the stream of input pixels are separated using a wavelet filter.

10. The method of claim 9, wherein the wavelet filter is reversible.

11. The method of claim 9, wherein the wavelet filter is a 5/3 lifted wavelet filter.

12. The method of claim 8, wherein the first portion of the stream corresponds to the low frequency components.

13. The method of claim 7, wherein the local activity is configured to indicate whether the first portion of the stream corresponds to a flat pattern portion of the image data.

14. The method of claim 7, wherein the local intensity corresponds to a brightness or color saturation of the first portion of the stream of pixels.

15. A non-transitory computer-readable medium comprising computer-executable instructions configured to cause a processor to:
receive a stream of input pixels associated with image data to be depicted on an electronic display;
apply a bi-lateral filter to the stream of input pixels to generate a first filtered output;
determine a local activity associated with the stream of input pixels;
determine a local intensity associated with the stream of input pixels;
generate a second filtered output based on a difference between the first filtered output and the stream of input pixels;
generate a third filtered output by attenuating the second filtered output based on the local activity and the local intensity;
combine the third filtered output with the first filtered output to generate a fourth filtered output configured to be depicted as the image data on the electronic display.

16. The non-transitory computer-readable medium of claim 15, wherein the stream of input pixels correspond to a tap of a spatial filter.

17. The non-transitory computer-readable medium of claim 15, wherein the second filtered output is determined based on:
a first attenuation factor for each pixel of the stream of pixels based on the local activity;
a second attenuation factor for each pixel of the stream of pixels based on the local intensity; and
a third attenuation factor for each pixel based on the first attenuation factor and the second attenuation factor.

18. The non-transitory computer-readable medium of claim 17, wherein the computer-executable instructions are configured to cause the processor to apply the third attenuation factor to each pixel of the first filtered output to generate the second filtered output.

19. The non-transitory computer-readable medium of claim 15, wherein the computer-executable instructions are configured to:
  receive statistics regarding a original bit depth, quantization values, block sizes, or any combination thereof from a video encoder or decoder; and
  tune the second filtered output based on the statistics.

20. The non-transitory computer-readable medium of claim 15, wherein the stream of input pixels corresponds to a tile portion of the image data.

* * * * *